(12) United States Patent
Inose et al.

(10) Patent No.: US 11,167,814 B2
(45) Date of Patent: Nov. 9, 2021

(54) STORAGE BOX POWER SUPPLY STRUCTURE FOR SADDLED VEHICLE

(71) Applicant: HONDA MOTOR CO., LTD., Tokyo (JP)

(72) Inventors: Koji Inose, Wako (JP); Yoshiyuki Horii, Wako (JP); Eijiro Asakawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/957,395

(22) PCT Filed: Sep. 18, 2018

(86) PCT No.: PCT/JP2018/034429
§ 371 (c)(1),
(2) Date: Jun. 24, 2020

(87) PCT Pub. No.: WO2019/130678
PCT Pub. Date: Jul. 4, 2019

(65) Prior Publication Data
US 2020/0324843 A1 Oct. 15, 2020

(30) Foreign Application Priority Data
Dec. 28, 2017 (JP) .............................. JP2017-254991

(51) Int. Cl.
*B62J 9/26* (2020.01)
*B62H 5/00* (2006.01)
(Continued)

(52) U.S. Cl.
CPC ................ *B62J 9/26* (2020.02); *B62H 5/001* (2013.01); *B62J 6/04* (2013.01); *B62J 7/04* (2013.01); *B62J 11/10* (2020.02)

(58) Field of Classification Search
CPC ......... B62J 9/26; B62J 6/04; B62J 7/04; B62J 11/10; B62H 5/001
See application file for complete search history.

(56) References Cited

U.S. PATENT DOCUMENTS

| 5,478,249 A | 12/1995 | Crestin |
| 2011/0037277 A1 | 2/2011 | Visenzi |
| 2016/0023704 A1 | 1/2016 | Kitayama et al. |

FOREIGN PATENT DOCUMENTS

| CN | 2141789 | 9/1993 |
| CN | 2863609 | 1/2007 |

(Continued)

OTHER PUBLICATIONS

International Search Report and Written Opinion for International Application No. PCT/JP2018/034429 dated Nov. 27, 2018, 10 pages.

(Continued)

*Primary Examiner* — Corey N Skurdal
(74) *Attorney, Agent, or Firm* — Amin, Turocy & Watson, LLP

(57) ABSTRACT

A storage box power supply structure for a saddled vehicle includes a storage box (30), a carrier (50) configured to detachably mount the storage box (30) on a vehicle body, a stopper (36) configured to position the storage box (30) on the carrier (50), a stopper receiving section (56) configured to receive the stopper (36), a stopper-side terminal (70) provided on the stopper (36) and configured to supply electric power to an electrical component (46), and a receiving-side terminal (80) provided on the stopper receiving section (56), connected to the stopper-side terminal (70) when the storage box (30) is mounted on the carrier (50) and configured to rub against the stopper-side terminal (70).

13 Claims, 19 Drawing Sheets

(51) Int. Cl.
   *B62J 6/04* (2020.01)
   *B62J 7/04* (2006.01)
   *B62J 11/10* (2020.01)

(56) References Cited

FOREIGN PATENT DOCUMENTS

| | | |
|---|---|---|
| CN | 102267515 | 12/2011 |
| DE | 202013002458 | 4/2013 |
| EP | 0882644 | 12/1998 |
| EP | 1078848 | 2/2001 |
| EP | 2626233 | 8/2013 |
| EP | 2738073 | 6/2014 |
| JP | 07-006814 | 1/1995 |
| JP | 09-231868 | 9/1997 |
| JP | 2011-511737 | 4/2011 |
| JP | 2012-245900 | 12/2012 |
| JP | 2013-129348 | 7/2013 |
| JP | 2013-169862 | 9/2013 |
| JP | 5794636 | 10/2015 |
| JP | 2016-028920 | 3/2016 |
| JP | 2016-068766 | 5/2016 |
| KR | 200460263 | 5/2012 |
| WO | 2014/157372 | 10/2014 |
| WO | 2015/068753 | 5/2015 |

OTHER PUBLICATIONS

Indian Office Action for Indian Patent Application No. 202047027490 dated Jan. 7, 2021.
Extended European Search Report for European Patent Application No. 18894890.5 dated Jan. 26, 2021.
International Preliminary Report on Patentability for International Application No. PCT/JP2018/034429 dated Dec. 17, 2019.

(a)

(b)

STORAGE BOX POWER SUPPLY STRUCTURE FOR SADDLED VEHICLE

TECHNICAL FIELD

The present invention relates to a storage box power supply structure for a saddled vehicle.

Priority is claimed on Japanese Patent Application No. 2017-254991, filed Dec. 28, 2017, the content of which is incorporated herein by reference.

BACKGROUND ART

In the related art, a storage box power supply structure for a saddled vehicle including a storage box having electrical components therein and a carrier configured to detachably mount the storage box on a vehicle body is disclosed (for example, see Patent Document 1). Since the storage box is attached to the carrier, a carrier-side connector and a storage box-side connector are connected, and electric power can be supplied to the electrical component from a battery of a vehicle.

RELATED ART DOCUMENT

Patent Document

Patent Document 1: Japanese Unexamined Patent Application, First Publication No. 2016-68766

SUMMARY

Problems to be Solved by the Invention

However, in Patent Document 1, in order to provide a power supply structure, a new power supply part (a box-side connector) is provided on a bottom section (a box-side facing section facing a carrier-side facing section) of a storage box, and it is necessary to greatly change shapes of the storage box and a carrier. In addition, in consideration of that the oxide film occurs on the terminal on the side of the storage box and the terminal on the side of the carrier or foreign substances such as sand bites or the like are adhered thereto, it is desired that self-cleaning can be actively performed according to an operation of attaching and detaching the storage box.

An aspect of the present invention is directed to providing a storage box power supply structure for a saddled vehicle in which self-cleaning of a power supply structure using a conventional structure is actively performed according to an operation of attaching and detaching a storage box while a novel power supply part is not provided in the storage box.

Means for Solving the Problem

An aspect of the present invention has the following configurations.

(1) A storage box power supply structure for a saddled vehicle according to an aspect of the present invention includes a storage box (30); a carrier (50) configured to detachably mount the storage box (30) on a vehicle body; a stopper (36) configured to position the storage box (30) on the carrier (50); a stopper receiving section (56) configured to receive the stopper (36); a stopper-side terminal (70) provided on the stopper (36) and configured to supply electric power to an electrical component (46); and a receiving-side terminal (80) provided on the stopper receiving section (56), connected to the stopper-side terminal (70) when the storage box (30) is mounted on the carrier (50) and configured to rub against the stopper-side terminal (70).

(2) In the storage box power supply structure for a saddled vehicle according to the above-mentioned (1), the stopper-side terminal (70) and the receiving-side terminal (80) may face each other in a forward/rearward direction when the storage box (30) is mounted on the carrier (50).

(3) The storage box power supply structure for a saddled vehicle according to the above-mentioned (1) or (2) may further include a biasing member (82) configured to bias at least one of the stopper-side terminal (70) and the receiving-side terminal (80) toward the other.

(4) In the storage box power supply structure for a saddled vehicle according to any one of the above-mentioned (1) to (3), at least one of the stopper-side terminal (70) and the receiving-side terminal (80) may include a bent section (80a) bent to protrude toward the other.

(5) In the storage box power supply structure for a saddled vehicle according to any one of the above-mentioned (1) to (4), the plurality of receiving-side terminals (80) may be provided at intervals in a vehicle width direction.

(6) The storage box power supply structure for a saddled vehicle according to the above-mentioned (5) may further include a partition wall (83) configured to divide accommodating spaces of the neighboring two receiving-side terminals (80).

(7) In the storage box power supply structure for a saddled vehicle according to the above-mentioned (6), at least a part of a protrusion edge (83a) of the partition wall (83) may be formed along an external form of the receiving-side terminal (80).

(8) In the storage box power supply structure for a saddled vehicle according to the above-mentioned (6) or (7), the protrusion edge (83a) of the partition wall (83) may be inclined to increase a protrusion height as the protrusion edge (83a) becomes further away from an introduction port (56i) of the stopper-side terminal (70).

(9) In the storage box power supply structure for a saddled vehicle according to any one of the above-mentioned (1) to (8), the stopper (36) may be provided on the side of the storage box (30), and the stopper receiving section (56) may be provided on the side of the carrier (50).

(10) In the storage box power supply structure for a saddled vehicle according to the above-mentioned (9), a vertical insertion hole (56h) that opens upward and downward in the vicinity of the stopper-side terminal (70) may be formed in the stopper receiving section (56).

(11) The storage box power supply structure for a saddled vehicle according to the above-mentioned (9) or (10) may further include a lid member (90) swingably provided on the carrier (50) and configured to cover an introduction port (56i) of the stopper-side terminal (70) when the storage box (30) is mounted on the carrier (50).

(12) In the storage box power supply structure for a saddled vehicle according to any one of the above-mentioned (1) to (11), the stopper (36) may include a load receiving section (36b) configured to receive a load from the stopper receiving section (56) before the stopper-side terminal (70) and the receiving-side terminal (80) are connected when the storage box (30) is mounted on the carrier (50).

(13) The storage box power supply structure for a saddled vehicle according to any one of the above-mentioned (1) to (12) may further include a hook (33) configured to connect the storage box (30) to the carrier (50); and a hook receiving section (53) configured to receive the hook (33), wherein the stopper-side terminal (70) and the receiving-side terminal (80) are configured to be connected by pushing the stopper (36) into the stopper receiving section (56) after the hook (33) is pushed into the hook receiving section (53).

(14) In the storage box power supply structure for a saddled vehicle according to any one of the above-mentioned (1) to (13), the pair of stoppers (36) may be provided on left and right sides.

Advantage of the Invention

According to the storage box power supply structure for a saddled vehicle according to the above-mentioned (1) of the present invention, since the receiving-side terminal provided on the stopper receiving section, connected to the stopper-side terminal when the storage box is mounted on the carrier and configured to rub against the stopper-side terminal is provided, the following effects are exhibited. Self-cleaning of the terminal can be performed by friction when the stopper-side terminal and the receiving-side terminal are connected. It is possible to remove an oxide film of the terminal or remove foreign substances such as sand bites or the like through self-cleaning of the terminal. In addition, since the power supply structure is provided on the stopper and the stopper receiving section, there is no need to provide a new power supply part on a bottom section of the storage box, and also there is no need to greatly change shapes of the storage box and the carrier. Accordingly, self-cleaning can be actively performed according to an operation of attaching and detaching the storage box using a power supply structure having a conventional structure without providing a new power supply part on the storage box.

According to the storage box power supply structure for a saddled vehicle according to the above-mentioned (2) of the present invention, since the stopper-side terminal and the receiving-side terminal face each other in the forward/rearward direction when the storage box is mounted on the carrier, flexibility in the vehicle width direction can be absorbed by the stopper-side terminal and the receiving-side terminal. Accordingly, variations at the connecting position to the terminal can be absorbed. In addition, friction due to vibrations in the contact portion (hereinafter, referred to as "a contact section") between the stopper-side terminal and the receiving-side terminal can be minimized.

According to the storage box power supply structure for a saddled vehicle of the above-mentioned (3) of the present invention, since the biasing member configured to bias at least one of the stopper-side terminal and the receiving-side terminal to the other is further provided, the stopper-side terminal and the receiving-side terminal can easily come into contact with each other.

According to the storage box power supply structure for a saddled vehicle according to the above-mentioned (4) of the present invention, since at least one of the stopper-side terminal and the receiving-side terminal includes the bent section that is bent to protrude toward the other, the following effects are exhibited. In comparison with the case in which both of the stopper-side terminal and the receiving-side terminal are formed in a flat plate shape, the stopper-side terminal and the receiving-side terminal can easily come into contact with each other.

According to the storage box power supply structure for a saddled vehicle according to the above-mentioned (5) of the present invention, since the plurality of receiving-side terminals are provided at intervals in the vehicle width direction, the following effects are exhibited. In comparison with the case in which only one receiving-side terminal is provided, connection between the stopper-side terminal and the receiving-side terminal can be reliably performed. For example, when the plurality of stopper-side terminals corresponding to the plurality of receiving-side terminals are provided, the terminals can be applied for various uses such as a positive electrode terminal, a negative electrode terminal, a terminal for a stop lamp, or the like.

According to the storage box power supply structure for a saddled vehicle according to the above-mentioned (6) of the present invention, since the partition wall configured to divide the accommodating spaces of the neighboring two receiving-side terminals is further provided, it is possible to prevent the neighboring two receiving-side terminals from coming in contact with each other.

According to the storage box power supply structure for a saddled vehicle according to the above-mentioned (7) of the present invention, since at least a part of the protrusion edge of the partition wall is formed along an external form of the receiving-side terminal, it is possible to prevent the partition wall from becoming an obstacle when the stopper is pushed into the stopper receiving section.

According to the storage box power supply structure for a saddled vehicle according to the above-mentioned (8) of the present invention, since the protrusion edge of the partition wall is inclined to increase a protrusion height as it is separated from the introduction port of the stopper-side terminal, the following effects are exhibited. Rigidity of the stopper receiving section can be increased by the partition wall while preventing the partition wall from becoming an obstacle when the stopper is pushed into the stopper receiving section.

According to the storage box power supply structure for a saddled vehicle according to the above-mentioned (9) of the present invention, since the stopper is provided on the side of the storage box and the stopper receiving section is provided on the side of the carrier, the following effects are exhibited. When the stopper-side terminal on the side of the storage box and the receiving-side terminal on the side of the carrier are connected, positioning of the terminal can be easily performed.

According to the storage box power supply structure for a saddled vehicle according to the above-mentioned (10) of the present invention, since the vertical insertion hole that opens upward and downward in the vicinity of the stopper-side terminal is formed in the stopper receiving section, drainage can be performed through the opening of the vertical insertion hole. For example, even when the storage box is mounted on the carrier when it's raining, it is possible to prevent rain water or the like from being collected in the stopper receiving section.

According to the storage box power supply structure for a saddled vehicle according to the above-mentioned (11) of the present invention, since the lid member swingably provided on the carrier and configured to cover the introduction port of the stopper-side terminal when the storage box is not mounted on the carrier, the stopper receiving section is not exposed to the outside by the lid member. Accordingly, when the storage box is not mounted on the carrier, it is possible to prevent foreign substances such as water, dust, and the like, from entering the stopper receiving section.

According to the storage box power supply structure for a saddled vehicle according to the above-mentioned (12) of the present invention, since the stopper includes the load receiving section configured to receive a load from the stopper receiving section before the stopper-side terminal and the receiving-side terminal are connected when the storage box is mounted on the carrier, it is possible to prevent an excessive load from being applied to the contact section.

According to the storage box power supply structure for a saddled vehicle according to the above-mentioned (13) of the present invention, since the stopper-side terminal and the receiving-side terminal are configured to be connected by pushing the stopper into the stopper receiving section after the hook is pushed into the hook receiving section, the following effects are exhibited. Since the stopper-side terminal and the receiving-side terminal are connected after they are positioned by the hook and the hook receiving section, the stopper-side terminal and the receiving-side terminal can be easily connected.

According to the storage box power supply structure for a saddled vehicle according to the above-mentioned (14) of the present invention, since the pair of stoppers are provided on left and right sides, the following effects are exhibited. Since the storage box and the carrier are positioned on left and right sides with good balance, in comparison with the case in which only one stopper is provided, the stopper-side terminal and the receiving-side terminal can easily come into contact with each other.

BRIEF DESCRIPTION OF THE DRAWINGS

FIG. 14(a) is a view showing a state in which the storage box is not mounted on the carrier. FIG. 14(b) is a view showing a state in which the storage box is mounted on the carrier.

FIG. 15(a) is a view showing a state in which the storage box is not mounted on the carrier. FIG. 15(b) is a view showing a state in which the storage box is mounted on the carrier.

FIG. 19(a) is a view showing a state in which the storage box is not mounted on the carrier. FIG. 19(b) is a view showing a state in which the storage box is mounted on the carrier.

DESCRIPTION OF THE EMBODIMENTS

Figure 1:
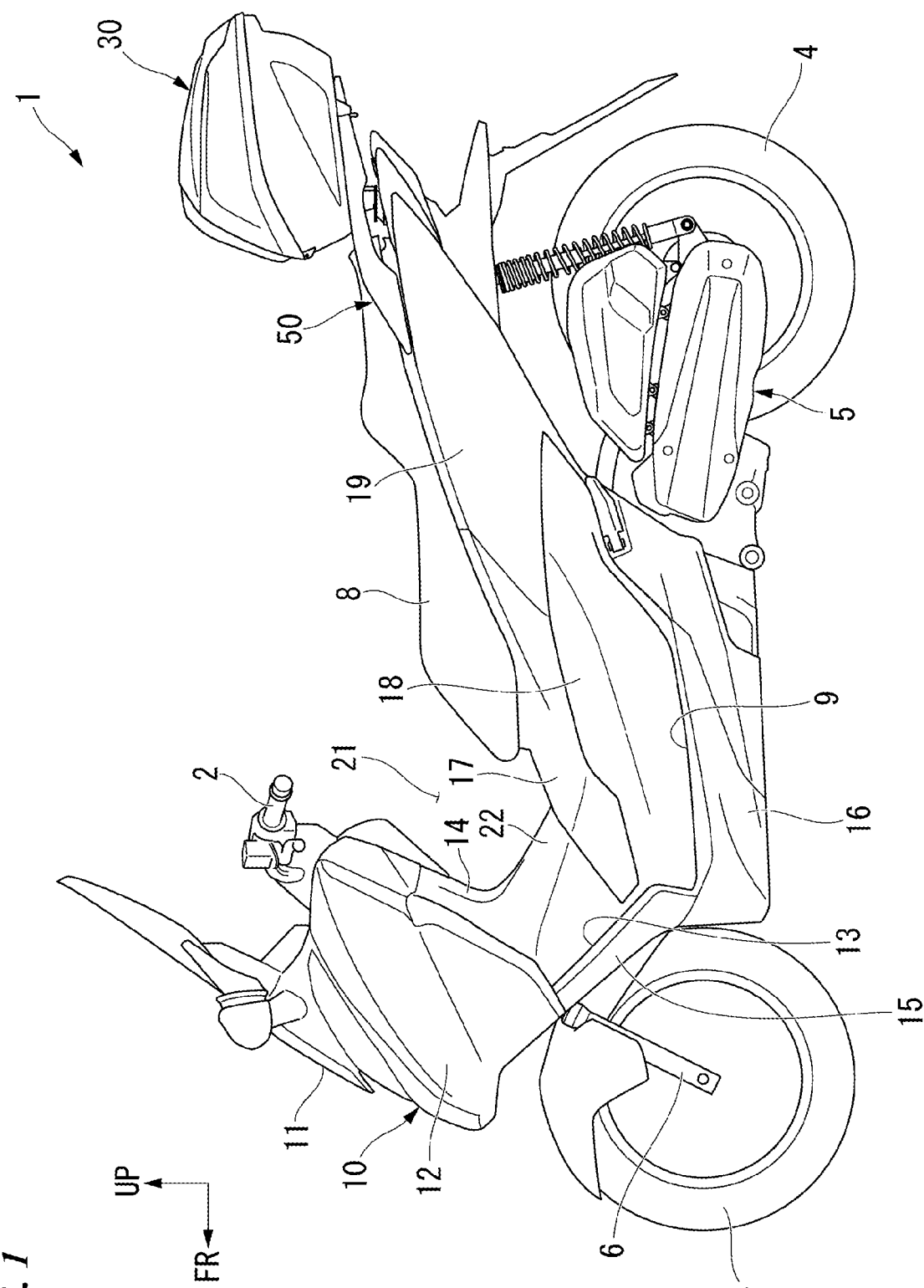
FIG. 1 is a left side view of a motorcycle according to an embodiment.

Hereinafter, an embodiment of the present invention will be described with reference the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle. In addition, reference sign CL indicates a lateral centerline of a vehicle body.

<Entire Vehicle>

FIG. 1 shows a unit swing motorcycle 1 as an example of a saddled vehicle. Referring to FIG. 1, the motorcycle 1 includes a front wheel 3 steered by a handle 2, and a rear wheel 4 driven by a power unit 5 including a power source. Hereinafter, the motorcycle may be simply referred to as "a vehicle." The motorcycle 1 of the embodiment is a scooter type vehicle having step floors 9 on which an occupant sitting on a seat 8 puts his/her legs.

Steering system parts including the handle 2 and the front wheel 3 are steerably pivoted by a head pipe (not shown) of a front end of a vehicle body frame. An outer circumference of the vehicle body frame is covered with a vehicle body cover 10. In FIG. 1, reference sign 6 indicates front forks.

A straddling section 21 having a relatively low height in the vehicle is provided between the handle 2 and the seat 8. The step floors 9 are provided on both of left and right sides of the straddling section 21. A center tunnel 22 extending forward and rearward to form a convex shape swelling upward is provided between the left and right step floors 9.

The vehicle body cover 10 includes a front center cover 11 configured to cover a periphery of a head pipe from a forward side, left and right front side covers 12 configured to cover the periphery of the head pipe from a front outward side, a front inner cover 14 configured to cover the periphery of the head pipe from a rearward side and configured to form a front section of the center tunnel 22 and left and right footrests 13, left and right floor front covers 15 continuous with lower rear sides of the left and right front side covers 12, left and right floor side covers 16 continuous with lower downward sides of the left and right floor front covers 15, a center upper cover 17 continuous with a lower rearward side of the front inner cover 14 and configured to form an upper surface of a rear section of the center tunnel 22, left and right center side covers 18 continuous with a rearward side of a lower section of the front inner cover 14 and configured to form a side surface of a rear section of the center tunnel 22, and left and right rear side covers 19 continuous with rearward sides of the center upper cover 17 and the left and right center side covers 18 and configured to cover the rear section of the vehicle body from a lateral side.

<Storage Box Power Supply Structure>

As shown in FIG. 1, a storage box power supply structure 25 (see FIG. 10) configured to supply electric power to electrical components provided in a storage box 30 or the like is provided in the rear section of the vehicle. The storage box power supply structure 25 includes the storage box 30, a carrier 50 configured to detachably mount the storage box 30 on the vehicle body, stoppers 36 (side stoppers 36 shown in FIG. 5) configured to position the storage box 30 on the carrier 50, stopper receiving sections 56 (see FIG. 7) configured to receive the stoppers 36, stopper-side terminals 70 (see FIG. 13) provided on the stoppers 36 and configured to supply electric power to the electrical component 46 (the lid lamp 46 shown in FIG. 2), and receiving-side terminals 80 (see FIG. 14) provided on the stopper receiving sections 56 and connected to the stopper-side terminals 70 when the storage box 30 is mounted on the carrier 50.

<Storage Box>

Figure 10:
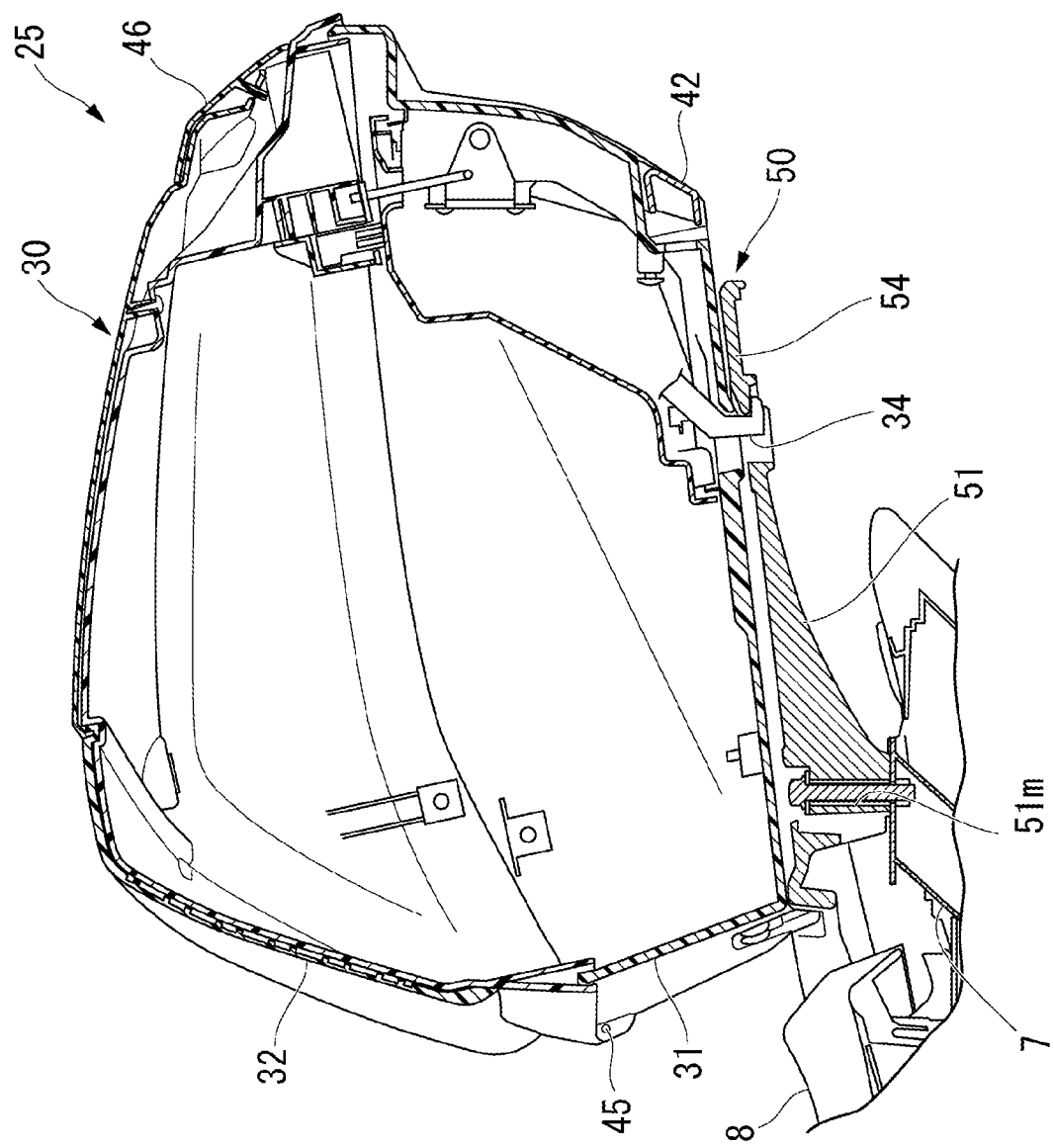
FIG. 10 is a view including a cross section taken along line X-X in FIG. 3.

As shown in FIG. 10, the storage box 30 is detachably attached to the carrier 50. The storage box 30 can store articles such as a helmet and the like. The storage box 30 includes a box main body 31 formed in a box shape that opens upward, and a lid 32 provided on an upper section of the box main body 31 to be opened and closed.

Figure 5:
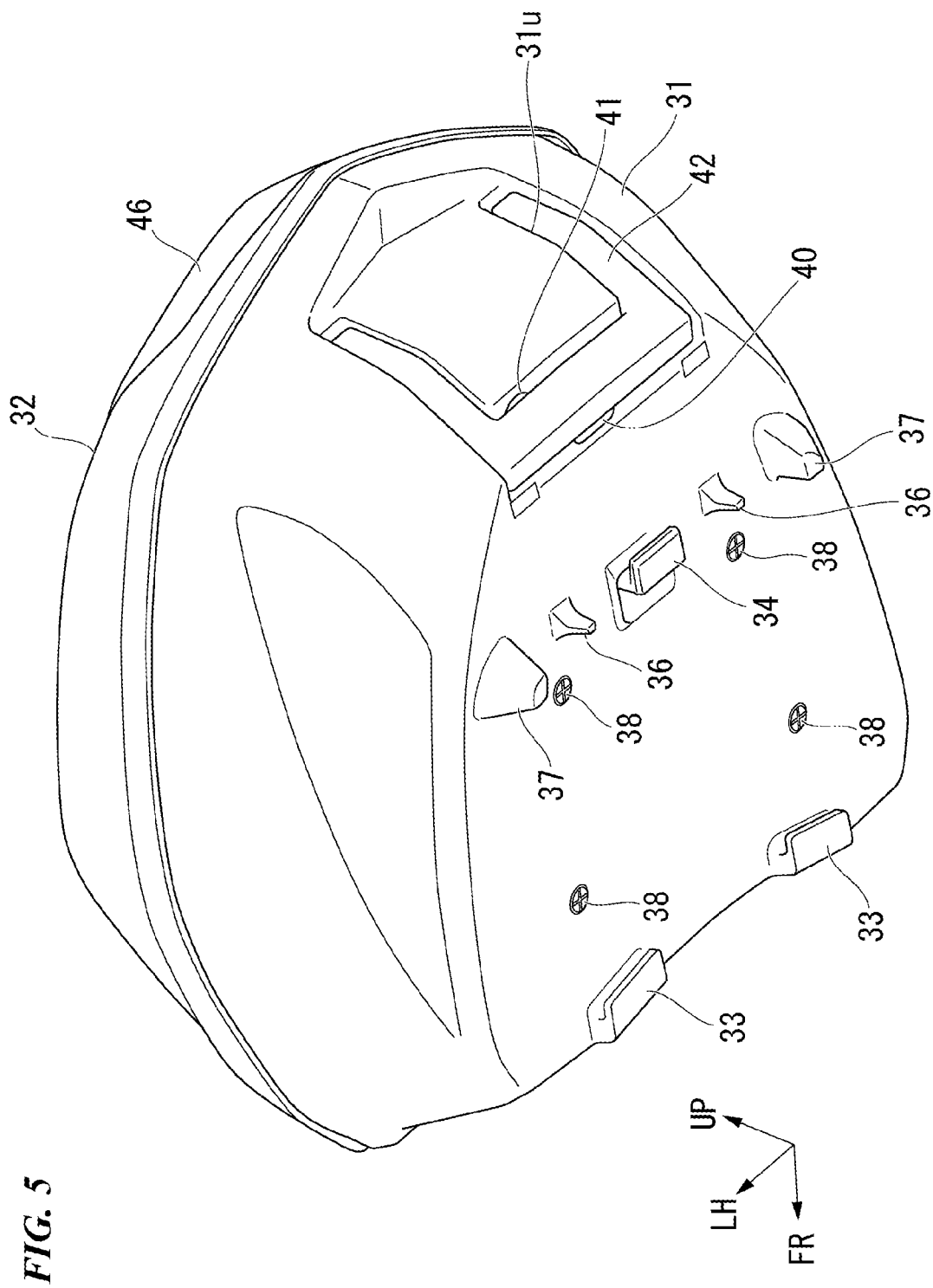
FIG. 5 is a perspective view showing the storage box according to the embodiment from below to the left.

As shown in FIG. 5, the box main body 31 includes the pair of left and right front hooks 33 disposed on a front lower section of the box main body 31, a rear hook 34 disposed at a center of a rear lower section of the box main body 31, a pair of left and right side stoppers 36 that face each other via the rear hook 34, a pair of left and right leg sections 37 that face each other via the left and right side stoppers 36, and a plurality of (four shown in the drawing) elastic members 38 provided on a lower surface of the box main body 31.

Figure 3:
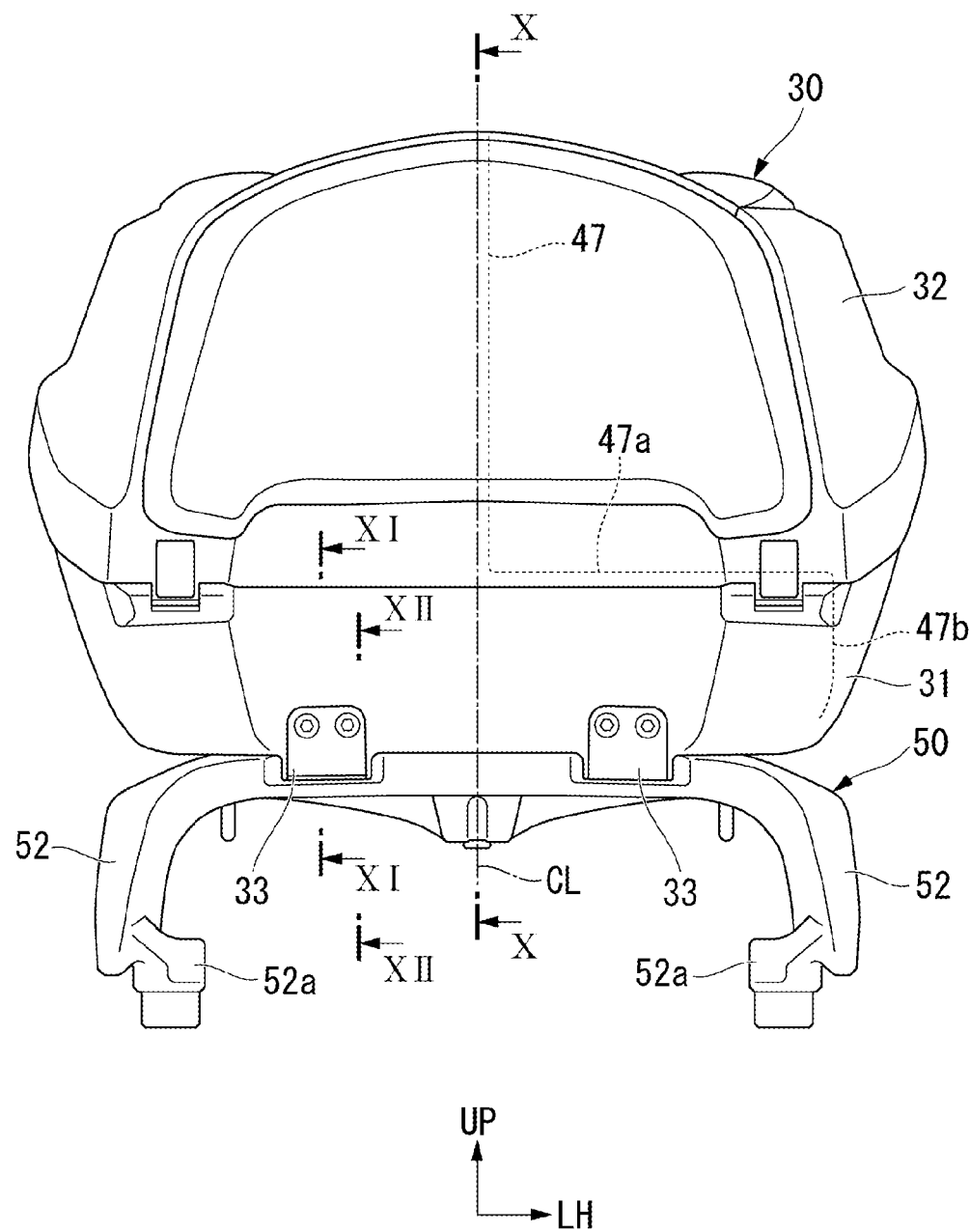
FIG. 3 is a front view of a storage box according to the embodiment.
Figure 4:
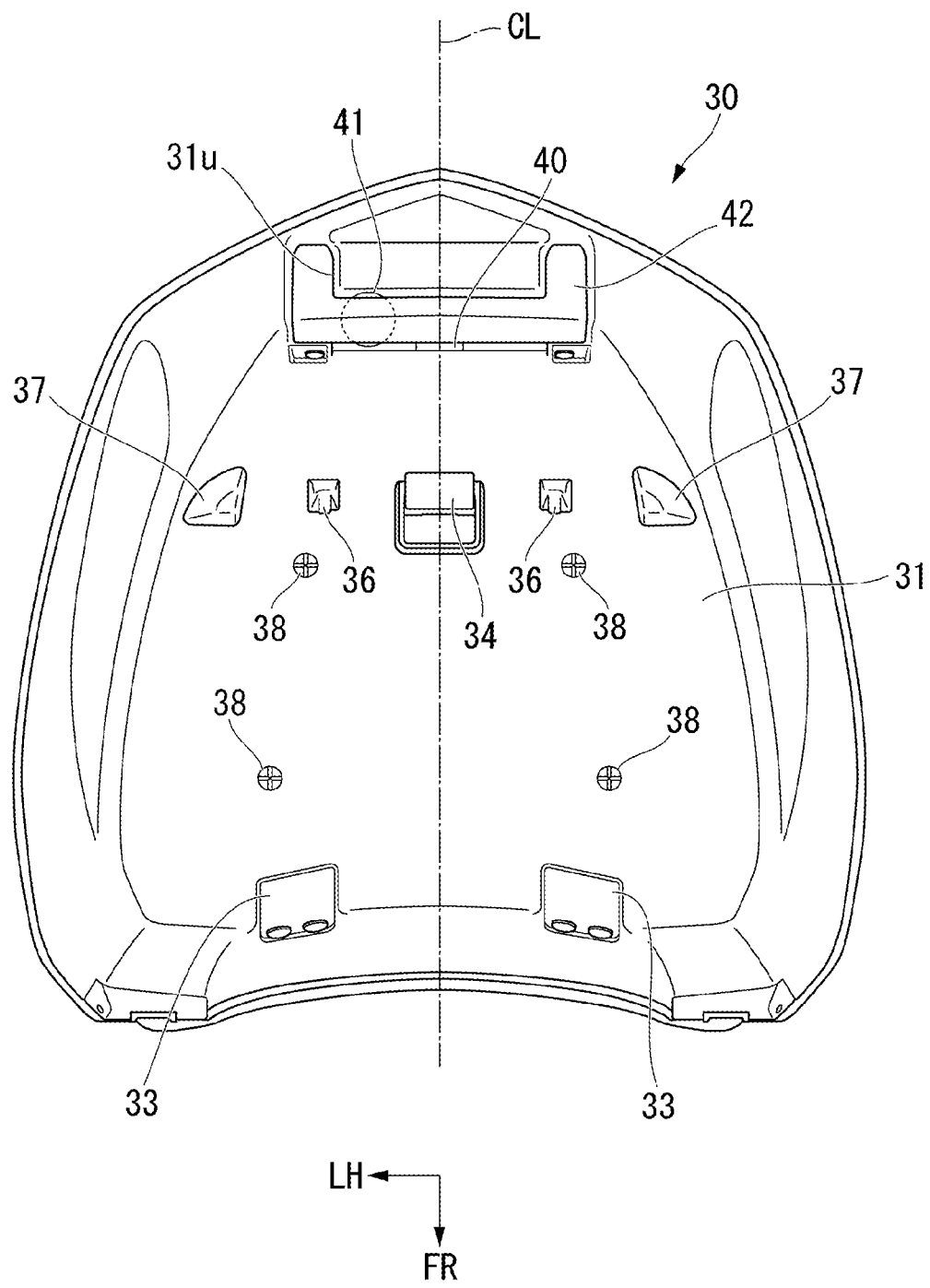
FIG. 4 is a bottom view of the storage box according to the embodiment.
Figure 11:
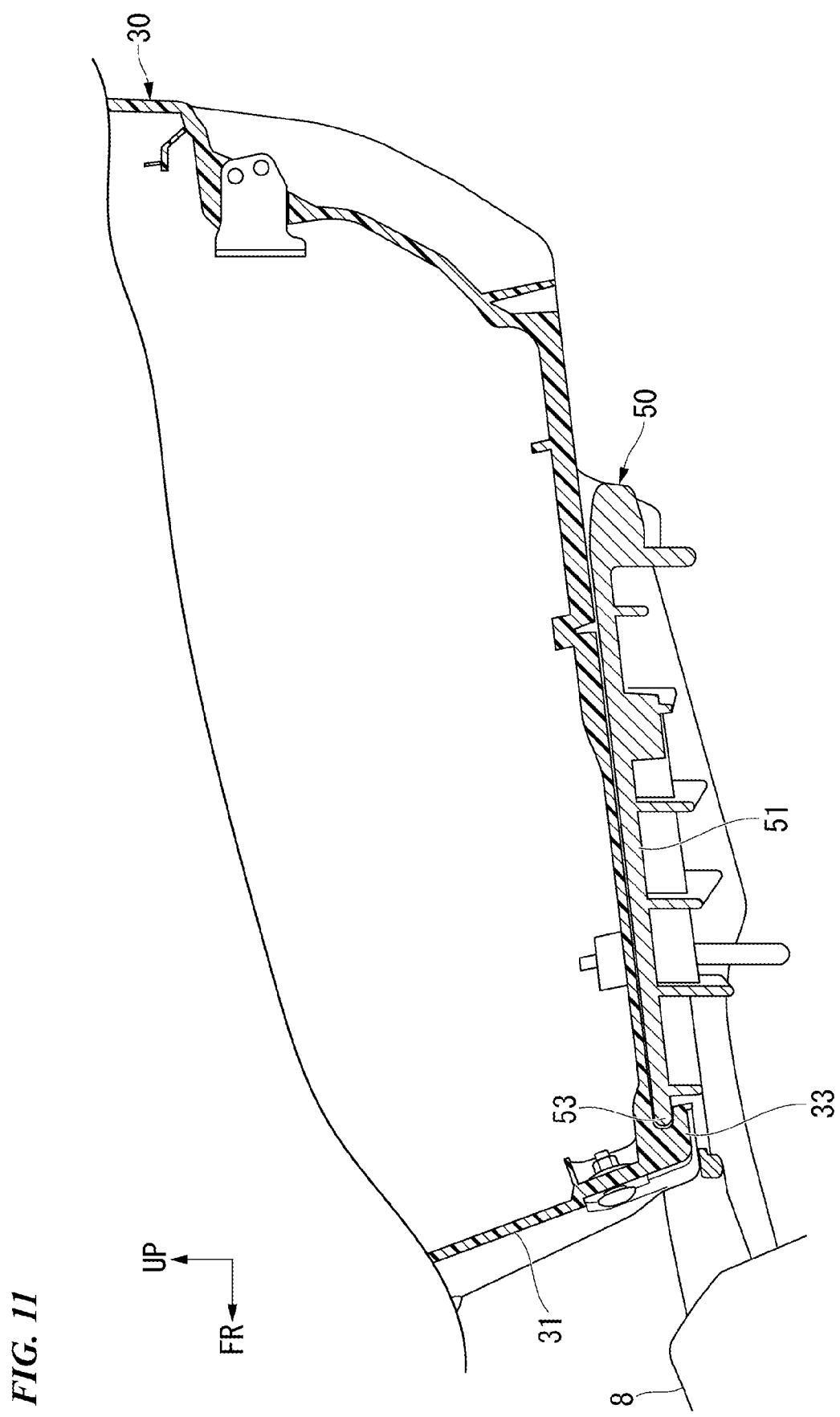
FIG. 11 is a view including a cross section taken along line XI-XI in FIG. 3.

As shown in FIG. 3, the pair of left and right front hooks 33 are disposed line-symmetrically with respect to a vehicle body lateral centerline CL as a symmetrical axis. Reinforcement sections of the left and right front hooks 33 are fixed to a front lower section of the box main body 31 by fastening members such as bolts or the like. As shown in FIG. 11, the left and right front hooks 33 are formed in an L shape extending downward from a front lower section of the box main body 31 and then extending to be bent rearward. When seen in a bottom view of FIG. 4, rear ends of the left and right front hooks 33 are inclined to be disposed rearward as they go inward in a vehicle width direction.

As shown in FIG. 10, the rear hook 34 is movable in conjunction with a pivoting operation of a key (not shown). For example, the rear hook 34 is movable between an engaging position and an engagement releasing position with respect to a rear hook receiving section 54 in conjunction with an operation of a rear hook locking mechanism (not shown) in conjunction with a pivoting operation of the key. The rear hook 34 is formed in an L shape extending downward from a lower section of the box main body 31 and then extending to be bent rearward.

As shown in FIG. 5, the left and right side stoppers 36 and the left and right leg sections 37 protrude downward from a lower surface of the box main body 31. A protrusion height of each of the left and right side stoppers 36 is smaller than a protrusion height of each of the left and right leg sections 37. Further, the left and right side stoppers 36 function as a load receiving section configured to receive a load in the forward/rearward direction.

The four elastic members 38 are disposed between the front and rear left and right front hooks 33 and left and right side stoppers 36. The four elastic members 38 are disposed at intervals in the forward/rearward direction and the vehicle width direction. For example, the elastic members 38 are vibration-proof rubbers.

A handle 42 is swingably attached to a rear section of the box main body 31. In a state in FIG. 5, the handle 42 is in a receiving state in which the handle 42 is received in a U-shaped groove 31u. In the receiving state, the handle 42 is disposed along a rear surface of the box main body 31.

The lid 32 is a box-shaped member configured to cover the box main body 31 from above. As shown in FIG. 10, the lid 32 is swingably attached to a front end portion of the box main body 31 via a rocking shaft 45. The lid 32 can be locked by a lid locking mechanism (not shown).

The lid lamp 46 serving as an electrical component is provided in a rear section of the lid 32. For example, the lid lamp 46 is a light emitting diode (LED). The lid lamp 46 is connected to the hook-side terminals 70 (see FIG. 13) via a cord 47 (see FIG. 3) routed on an inner surface of the lid 32.

For example, a portion 47a (see FIG. 3) of the cord 47 close to a front section of the lid 32 is preferably disposed parallel to the rocking shaft 45 (see FIG. 10). Accordingly, bending of the cord 47 can be avoided and disconnection thereof can be prevented.

For example, a portion 47b (see FIG. 3) of the cord 47 close to a front section of the box main body 31 is preferably disposed along an inner wall of a corner section of the box main body 31. Accordingly, even when articles such as a helmet and the like are stored in the storage box 30, it is possible to prevent the cord 47 from coming in contact with the articles such as a helmet or the like.

<Carrier>

Figure 2:
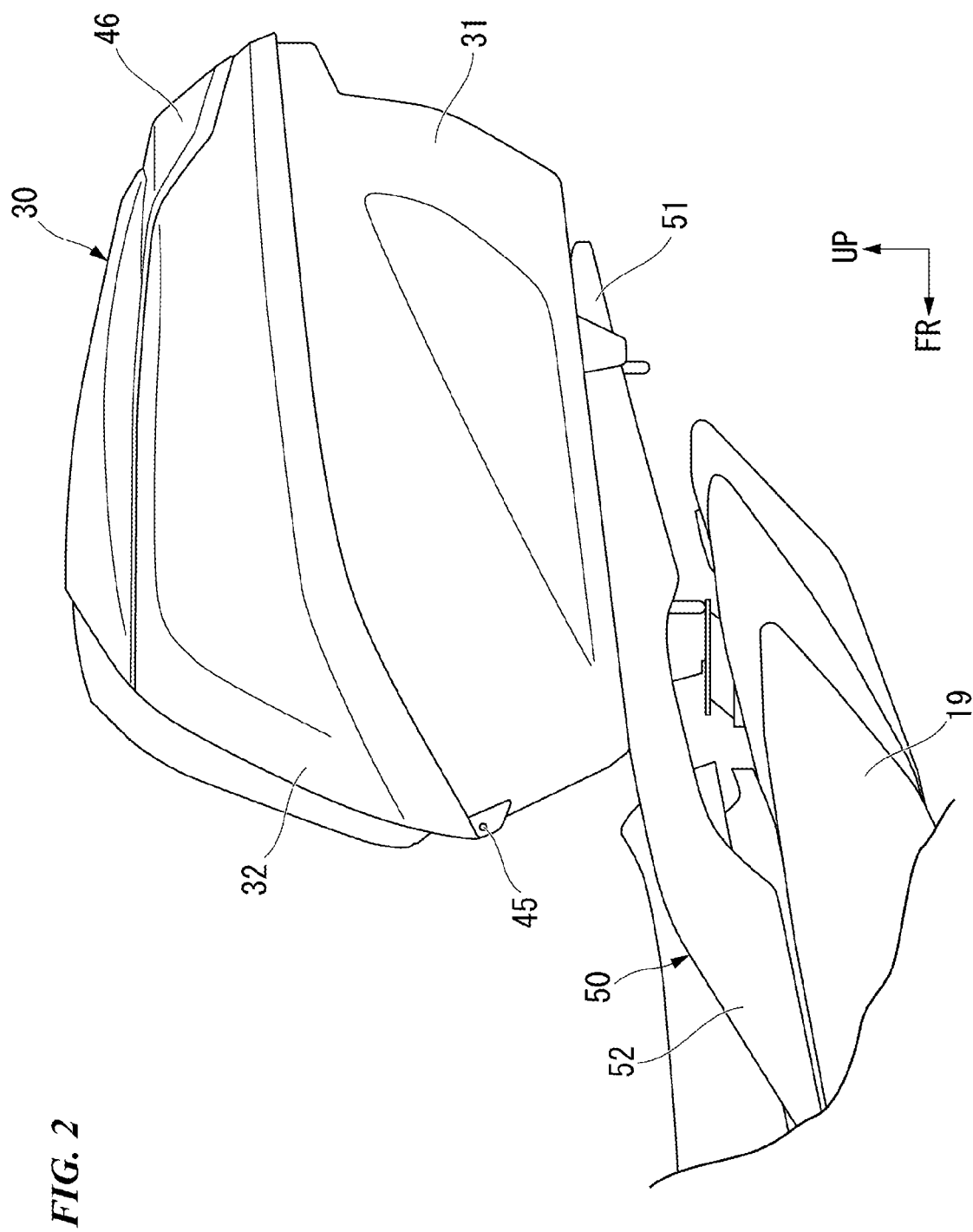
FIG. 2 is a left side view of a vehicle rear section of the motorcycle according to the embodiment.
Figure 7:
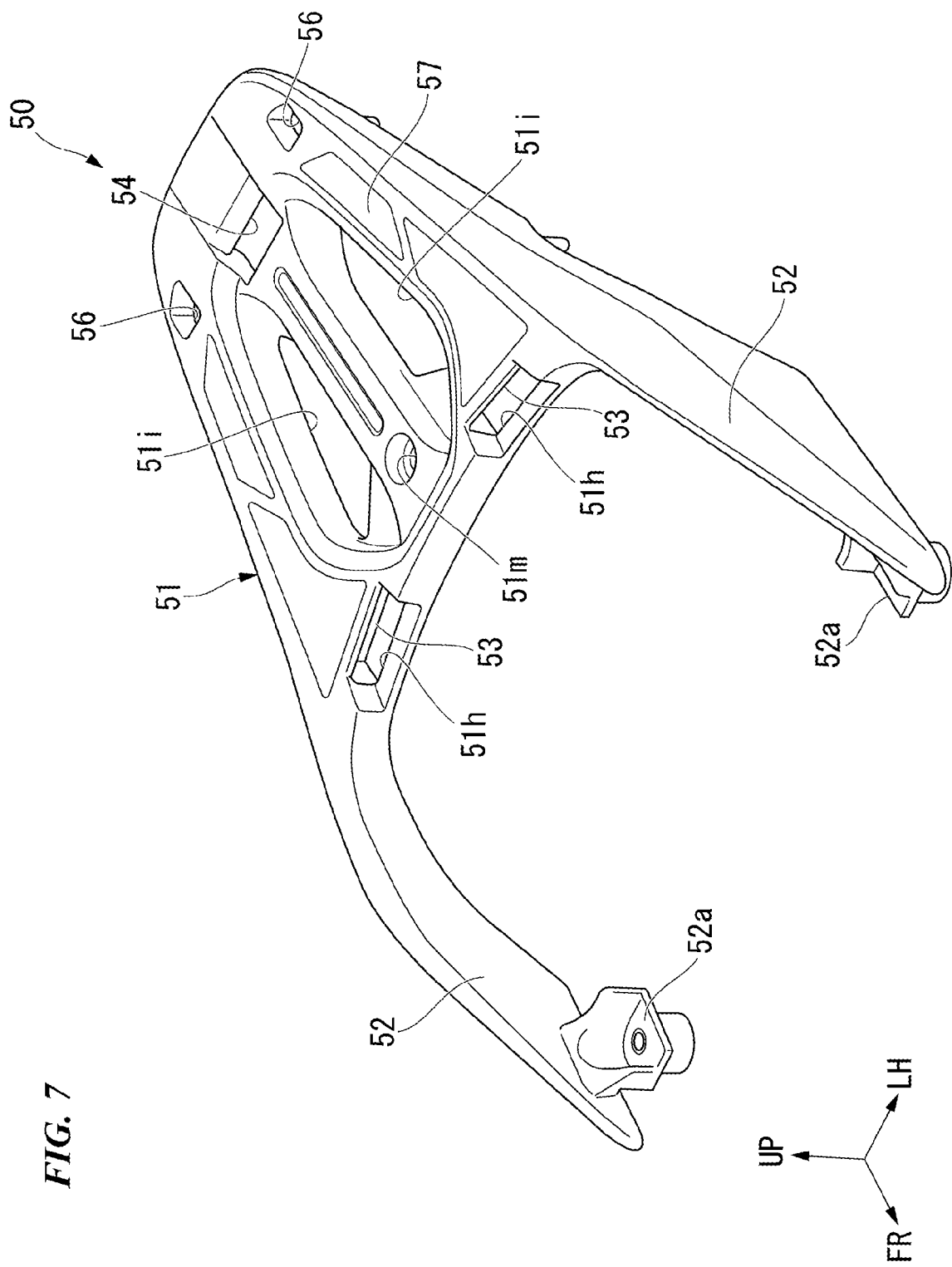
FIG. 7 is a perspective view showing the carrier according to the embodiment from above to the left.

As shown in FIG. 2, the carrier 50 is configured to detachably mount the storage box 30 on the vehicle body. As shown in FIG. 7, the carrier 50 includes a carrier main body 51 on which the storage box 30 is mounted, and a pair of left and right grab rails 52 that are grabbed by an occupant. The carrier main body 51 and the left and right grab rails 52 are integrally formed of the same member.

Figure 8:
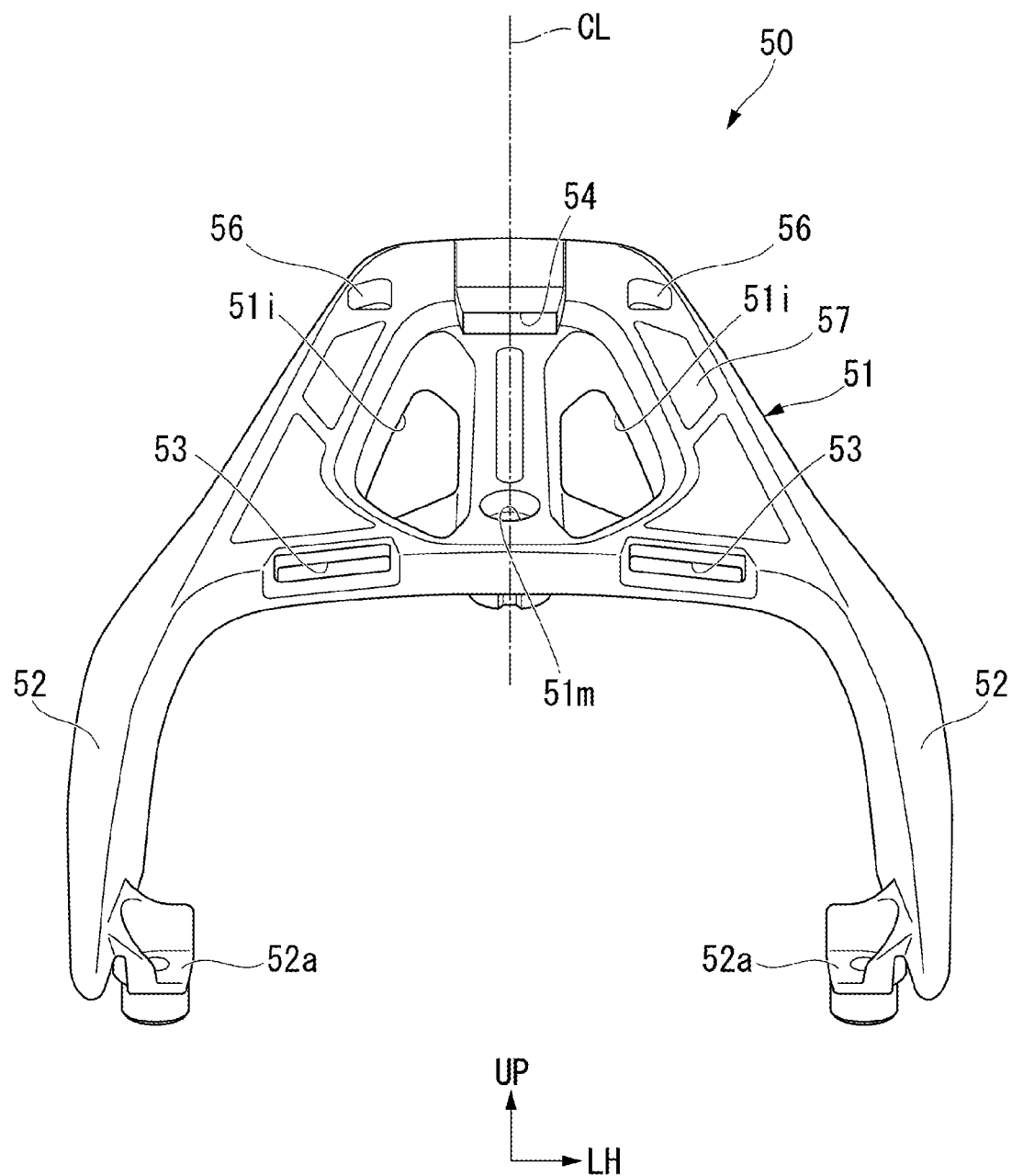
FIG. 8 is a perspective view showing the carrier according to the embodiment from above to the front.
Figure 12:
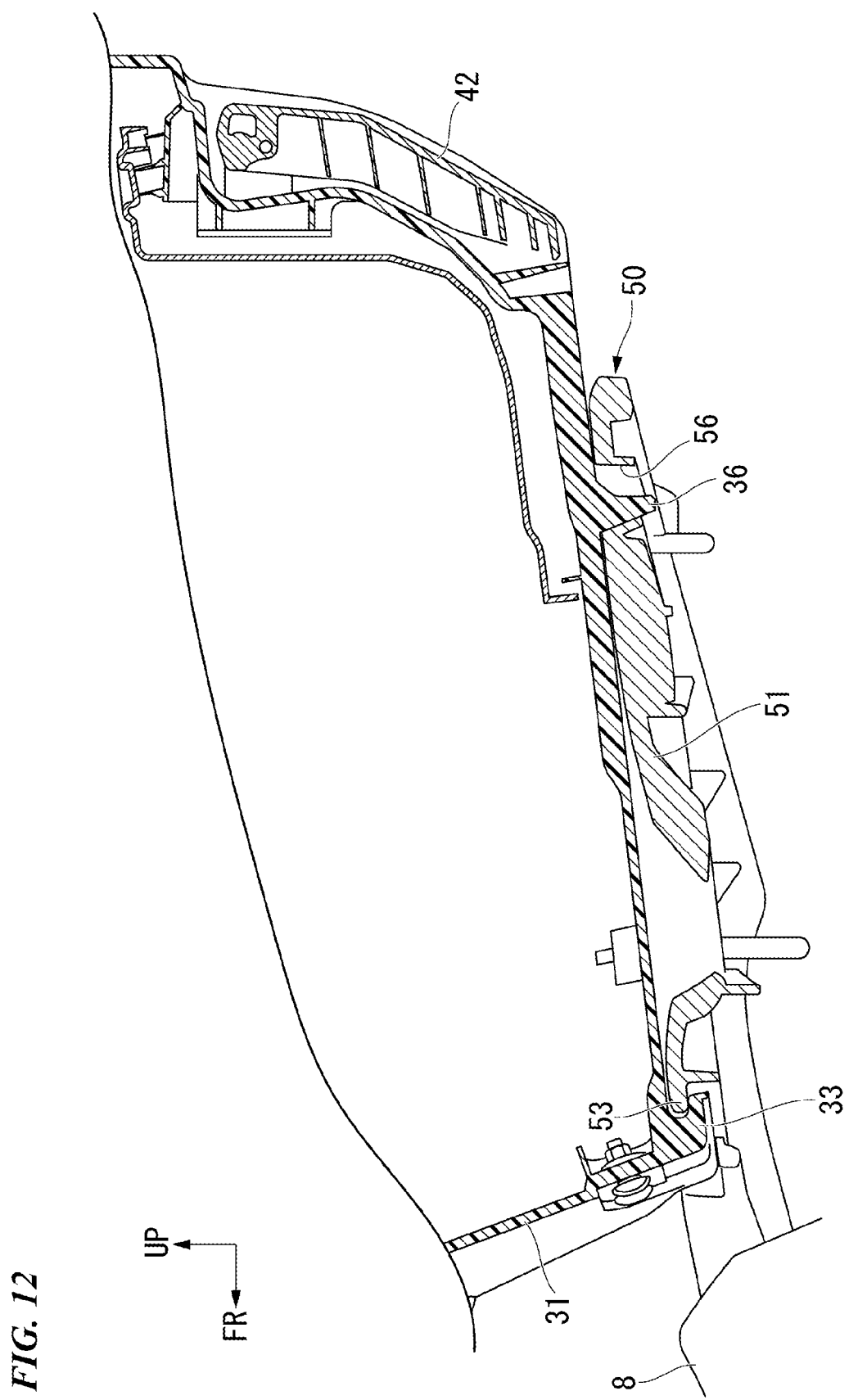
FIG. 12 is a view including a cross section taken along line XII-XII in FIG. 3.

As shown in FIG. 8, the carrier main body 51 has an external form having a width in the vehicle width direction that is reduced rearward. As shown in FIG. 7, the carrier main body 51 includes the pair of left and right front hook receiving sections 53 (see FIG. 11) configured to receive the left and right front hooks 33 (see FIG. 5), the rear hook receiving section 54 (see FIG. 10) configured to receive the rear hook 34 (see FIG. 5), a pair of left and right side insertion holes 56 (see FIG. 12) into which the left and right side stoppers 36 (see FIG. 5) are inserted, and a seat surface 57 which the elastic members 38 (see FIG. 5) abut, when the storage box 30 (see FIG. 2) is mounted on the carrier main body 51.

Figure 6:
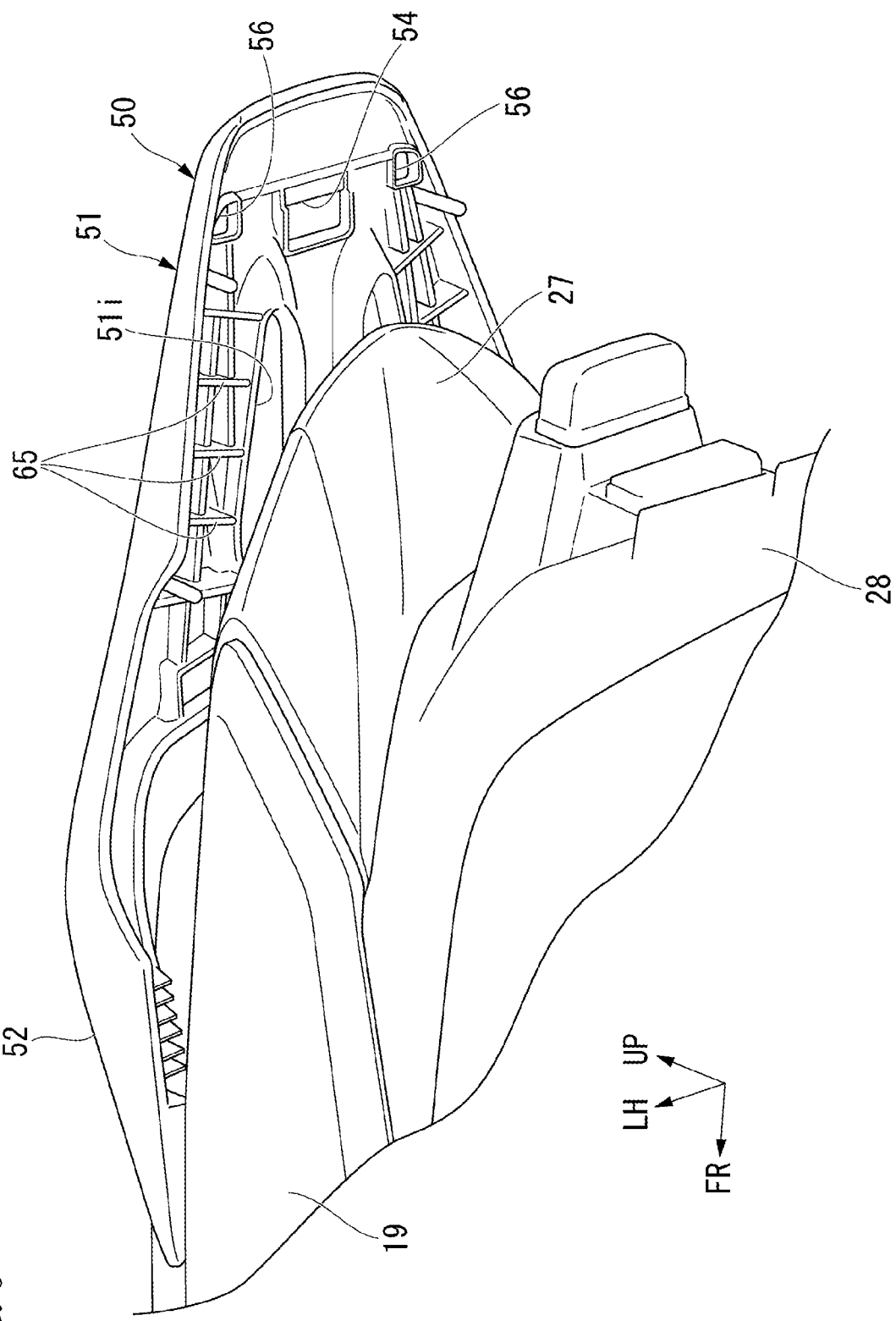
FIG. 6 is a perspective view of a vehicle rear section when the storage box according to the embodiment is removed from a carrier when seen from below to the left.

As shown in FIG. 7, vertical opening sections 51h that open upward and downward in the vicinity of the front hook receiving sections 53 are provided in the front section of the carrier main body 51. When seen in a bottom view of FIG. 9, the vertical opening sections 51h each have a long hole shape extending to be disposed rearward as it goes inward in the vehicle width direction. In FIG. 6, reference sign 27 designates a tail light, and reference sign 28 designates a rear fender.

Figure 9:
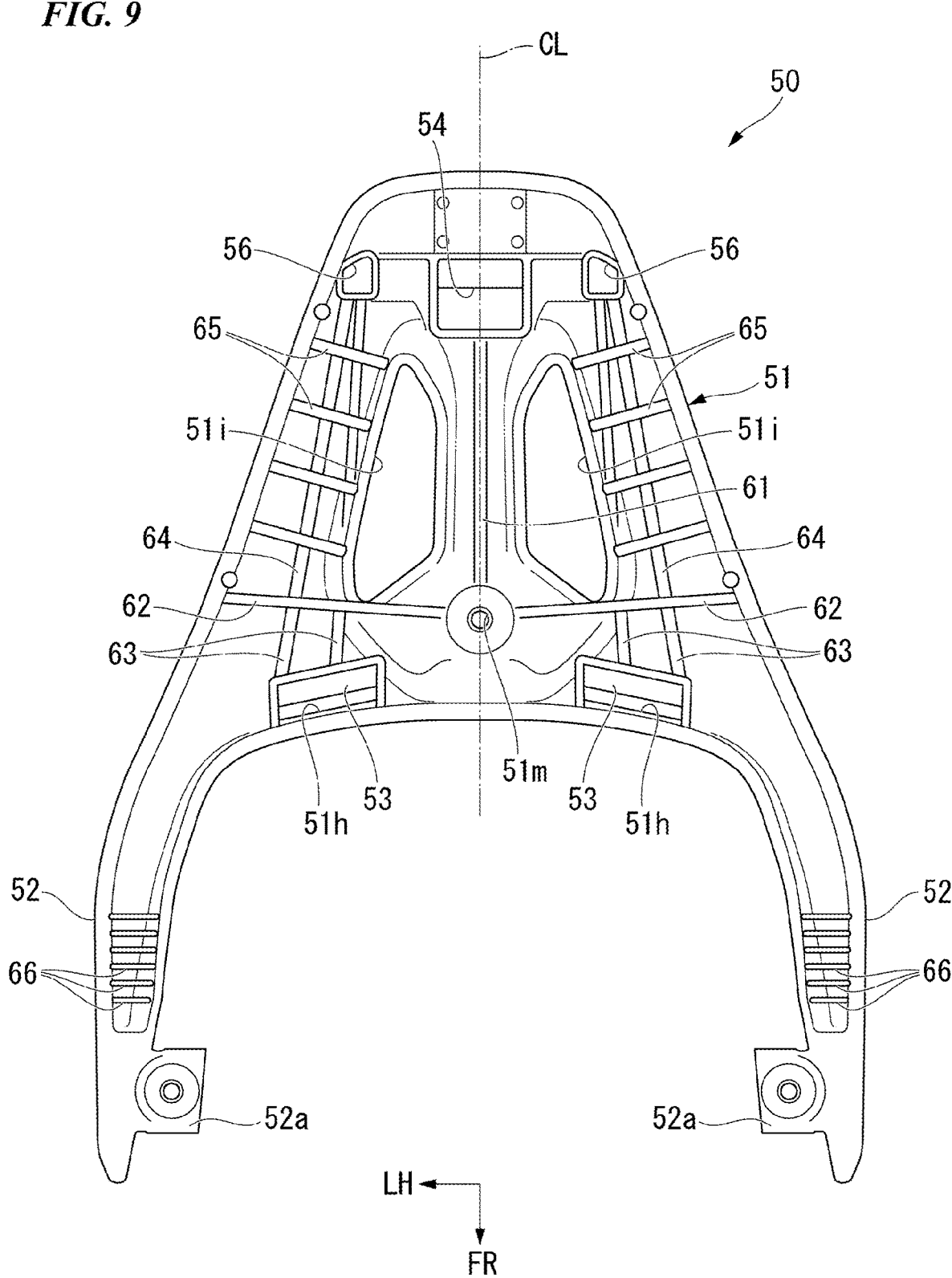
FIG. 9 is a bottom view of the carrier according to the embodiment.

As shown in FIG. 9, the carrier main body 51 has a pair of left and right opening sections 51i formed in the central section of the carrier main body 51 to open upward and downward, and a front section insertion hole 51m formed in the front section of the carrier main body 51 to open upward and downward.

When seen in a bottom view of FIG. 9, the left and right opening sections 51i each have a long hole shape extending forward and rearward.

When seen in a bottom view of FIG. 9, the front section insertion hole 51m has a circular shape. The front section insertion hole 51m is an insertion hole through which a shaft section of a bolt configured to fix the carrier main body 51 to a rear frame 7 (see FIG. 10) is inserted.

As shown in FIG. 8, the left and right grab rails 52 extend forward from an outer end portion of the front section of the carrier main body 51 in the vehicle width direction. When seen in a left side view of FIG. 2, upper edges of the left and right grab rails 52 are inclined to be disposed downward as they go forward. As shown in FIG. 8, inward protrusion sections 52a protruding inward from front end portions of the left and right grab rails 52 in the vehicle width direction are provided on the left and right grab rails 52. The inward protrusion sections 52a are fixed to the rear frame 7 (see FIG. 10) by fastening members (not shown) such as bolts or the like.

As shown in FIG. 9, a plurality of ribs 61 to 66 are provided on a lower section of the carrier 50. The plurality of ribs 61 to 66 are a first rib 61 extending forward and rearward to cross a forming section of the front section insertion hole 51m and the rear hook receiving section 54, a second rib 62 extending in the vehicle width direction to cross the forming section of the front section insertion hole 51m and an outer edge of the carrier main body 51 in the vehicle width direction, a third rib 63 extending to cross the left and right front hook receiving sections 53 and the second rib 62, a fourth rib 64 extending to cross forming sections of the stopper receiving sections 56 and the second rib 62, a fifth rib 65 extending to cross from outer edges of the left and right opening sections 51i in the vehicle width direction to an outer edge of the carrier main body 51 in the vehicle width direction, and sixth ribs 66 extending from front lower sections of the left and right grab rails 52 in the vehicle width direction.

<Stopper-Side Terminal>

Figure 13:
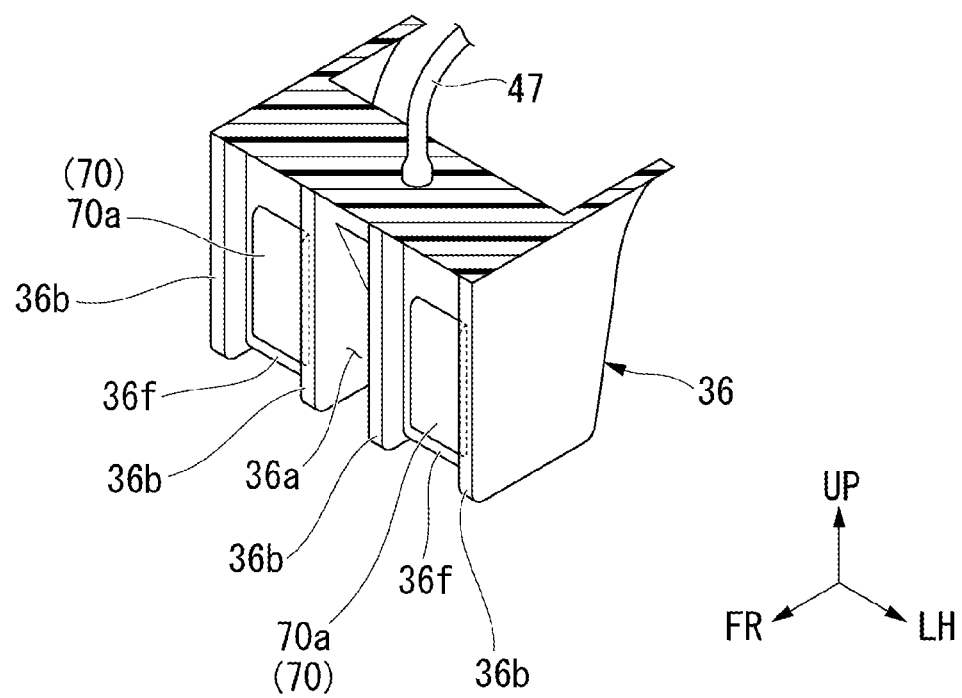
FIG. 13 is a perspective view showing a stopper according to the embodiment from above to the left.
Figure 14:
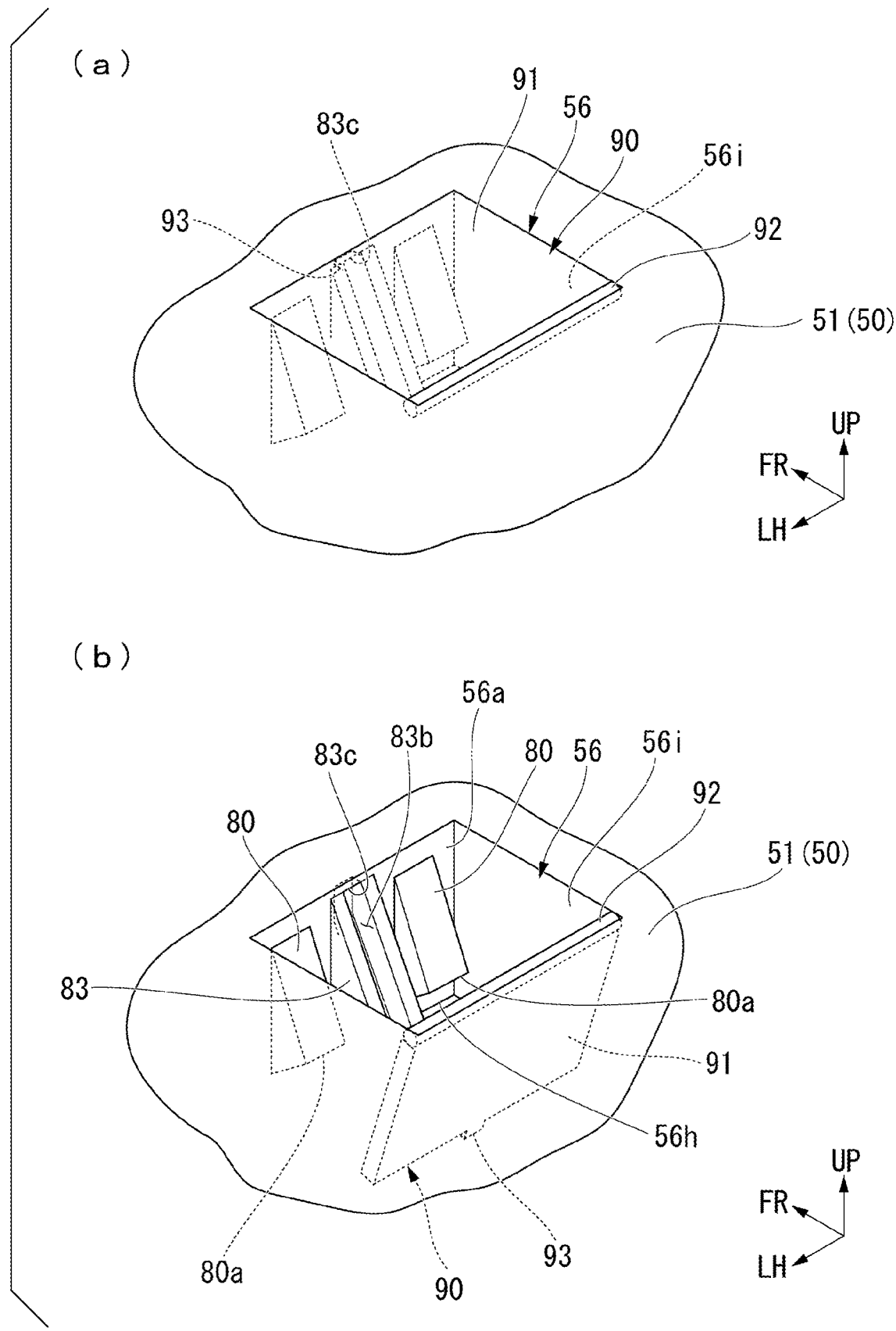
FIG. 14 is a perspective view showing a stopper receiving section according to the embodiment from above to the left.

As shown in FIG. 13, the stopper-side terminals 70 are provided on the front sections of the side stoppers 36 (hereinafter, simply referred to as "the stoppers 36"). The plurality of (in FIG. 13, two) stopper-side terminals 70 are provided with an interval therebetween in the vehicle width direction. The stopper-side terminals 70 are provided on the left and right stoppers 36, respectively. The stopper-side terminals 70 extend in the upward/downward direction and each have a plate shape having a thickness in the forward/rearward direction. As shown in FIG. 15(b), the stopper-side terminals 70 and the receiving-side terminals 80 face each other in the forward/rearward direction when the storage box 30 is mounted on the carrier 50.

In FIG. 4, FIG. 5, FIG. 12 and FIG. 16, illustration of the stopper-side terminals 70 is omitted.

When seen in a left side view of FIG. 15(a), the stoppers 36 each have an external form having a longitudinal width that is reduced downward. Concave escape sections 36a recessed to avoid partition walls 83 when the storage box 30 is mounted on the carrier 50 are provided in the stoppers 36.

As shown in FIG. 13, the two stopper-side terminals 70 are arranged on left and right sides via the concave escape sections 36a.

The stoppers 36 include load receiving sections 36b configured to receive a load from the stopper receiving sections 56 before the stopper-side terminals 70 and the receiving-side terminals 80 are connected when the storage box 30 is mounted on the carrier 50. The load receiving sections 36b are disposed outward from the stopper-side terminals 70 in the vehicle width direction.

As shown in FIG. 15(a), the load receiving sections 36b protrude forward from installation surfaces 36f of the stopper-side terminals 70. A height (a thickness) of the stopper-side terminals 70 is smaller than that of protrusion ends of the load receiving sections 36b. The stopper-side terminals 70 are disposed further rearward (inward) than the protrusion ends of the load receiving sections 36b of the stoppers 36.

One end of the cord 47 is connected to the stopper-side terminals 70. Further, the other end of the cord 47 is connected to the lid lamp 46 (see FIG. 5).

<Receiving-Side Terminal>

As shown in FIG. 14(b), the receiving-side terminals 80 are provided on rear sections of vertical walls 56a of the stopper receiving sections 56. The plurality of (in FIG. 14(b), two) receiving-side terminals 80 are provided at an interval in the vehicle width direction. The receiving-side terminals 80 are provided in the left and right stopper receiving sections 56, respectively.

As shown in FIG. 15(b), the receiving-side terminals 80 are connected to the stopper-side terminals 70 when the storage box 30 is mounted on the carrier 50. The receiving-side terminals 80 are connected to the stopper-side terminals 70 and rub against the stopper-side terminals 70 when the storage box 30 is mounted on the carrier 50. The stopper-side terminals 70 and the receiving-side terminals 80 are configured to be connected by pushing the stoppers 36 into the stopper receiving sections 56 after the front hooks 33 are pushed into the hook receiving section 53 (see FIG. 16).

In FIG. 7, FIG. 8, FIG. 9, FIG. 12 and FIG. 16, illustration of the receiving-side terminals 80 will be omitted.

When seen in a left side view of FIG. 15(b), the receiving-side terminals 80 include bent sections 80a extending in the upward/downward direction and bent to protrude toward the stopper-side terminals 70. Contact portions between flat surface sections 70a of the stopper-side terminals 70 and the bent sections 80a of the receiving-side terminals 80 become contact sections of the terminals 70 and 80.

The receiving-side terminals 80 are swingably attached to the vertical walls 56a. Upper end portions of the receiving-side terminals 80 are pivotable around a support shaft (not shown) extending in the vehicle width direction.

Biasing members 82 configured to bias the receiving-side terminals 80 toward the stopper-side terminals 70 are attached to the receiving-side terminals 80. For example, the biasing members 82 are coil springs.

Portions of the receiving-side terminals 80 opposite to the stopper-side terminals 70 are connected to a battery (not shown) on the side of the vehicle body via the wiring 85.

Vertical insertion holes 56h that open upward in the vicinity of the receiving-side terminals 80 are provided in the stopper receiving sections 56. The vertical insertion holes 56h communicate with introduction ports 56i (hereinafter, referred to as "stopper introduction ports 56i") of the stopper-side terminals 70 in the upward/downward direction.

<Partition Wall>

As shown in FIG. 14(b), the partition walls 83 configured to divide accommodating spaces of the neighboring two receiving-side terminals 80 are provided on the vertical walls 56a of the stopper receiving sections 56. As shown in FIG. 15(a), the partition walls 83 protrude rearward from the vertical walls 56a and extend upward and downward. Parts of protrusion edges 83a of the partition walls 83 are formed along external forms of the receiving-side terminals 80. The protrusion edges 83a of the partition walls 83 are inclined such that a protrusion height increases going away from the introduction ports 56i of the stopper-side terminals 70 (downward).

When seen in a left side view of FIG. 15(a), the protrusion edges 83a of the partition walls 83 are formed in a linear shape that is inclined to be disposed downward as it goes rearward. A protrusion height of the receiving-side terminals 80 is smaller than that of the protrusion edges 83a of the partition walls 83. The receiving-side terminals 80 are disposed further forward (inward) than the protrusion edges 83a of the partition walls 83 in the stopper receiving sections 56.

<Lid Member>

As shown in FIG. 14(a), lid members 90 swingably provided on the carrier 50 and configured to cover the stopper introduction ports 56i when the storage box 30 is not mounted on the carrier 50 may be provided on the stopper receiving sections 56.

The lid members 90 include rectangular plate-shaped lid main bodies 91 configured to cover the stopper introduction ports 56i, hinge shafts 92 extending in the vehicle width direction and configured to pivotably support the lid main bodies 91, and locking claws 93 protruding from tips of the lid main bodies 91.

The lid members 90 are normally biased by spring members (not shown) in an arrow K1 direction (see FIG. 15(a)). Claw receiving sections 83c configured to receive the locking claws 93 are provided in upper end portions of the partition walls 83. The lid members 90 are pivoted against biasing forces of the spring members in an arrow K2 direction (see FIG. 15(b)) when the storage box 30 is mounted on the carrier 50. As shown in FIG. 14(b), escape grooves 83b recessed to avoid the locking claws 93 when the storage box 30 is mounted on the carrier 50 are provided in protrusion ends of the vertical walls 56a.

Figure 15:
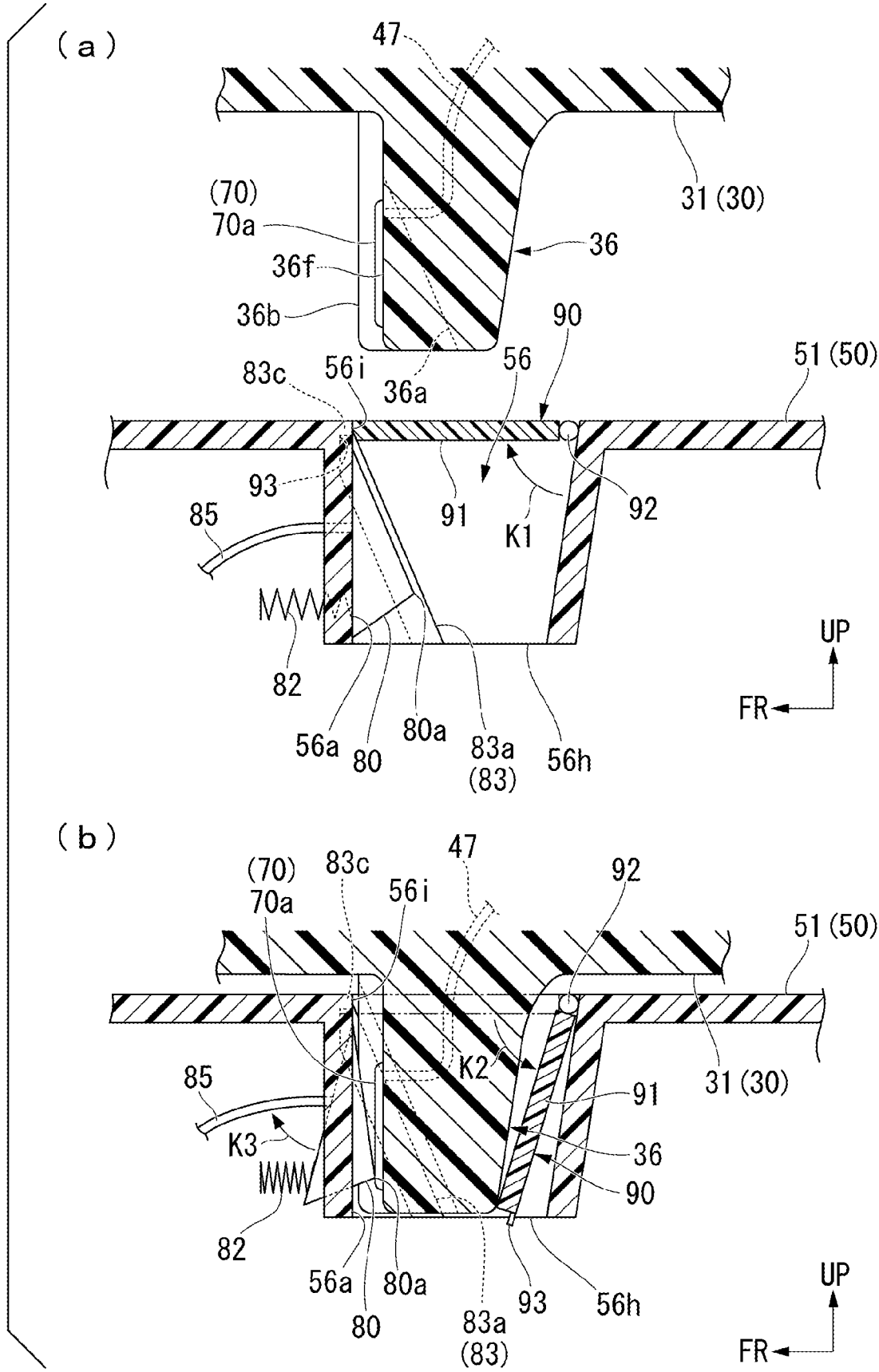
FIG. 15 is a view including cross sections of the stopper and the stopper receiving section according to the embodiment.

As shown in FIG. 2, since the storage box 30 is attached to the carrier 50, the receiving-side terminals 80 (see FIG. 15) on the side of the carrier 50 and the stopper-side terminals 70 (see FIG. 15) on the side of the storage box 30 are connected to each other. Specifically, as shown in FIG. 15, since the stopper receiving sections 56 receive the stoppers 36 after the front hooks 33 are pushed into the hook receiving section 53 (see FIG. 16), the stopper-side terminals 70 and the receiving-side terminals 80 are connected to each other. Here, the receiving-side terminals 80 are pivoted against biasing forces of biasing members 82 in an arrow K3 direction while being connected to the stopper-side terminals 70. Accordingly, electric power can be supplied to the electrical component on the side of the lid 32 (the lid lamp 46 shown in FIG. 5) from the battery (not shown) on the side of the vehicle body.

<Assembling Procedure of Storage Box>

Hereinafter, an example of a procedure of attaching the storage box 30 to the carrier 50 will be described.

For example, when the storage box 30 is attached to the carrier 50, a procedure of the following (1) to (5) is performed.

(1) First, the handle 42 is lifted, and a key cylinder 41 is exposed to the outside.

(2) Next, a key is inserted into the key cylinder 41 and pivoted clockwise, and locking of the box main body 31 is released.

(3) Next, the storage box 30 is mounted on the carrier 50.

Figure 16:
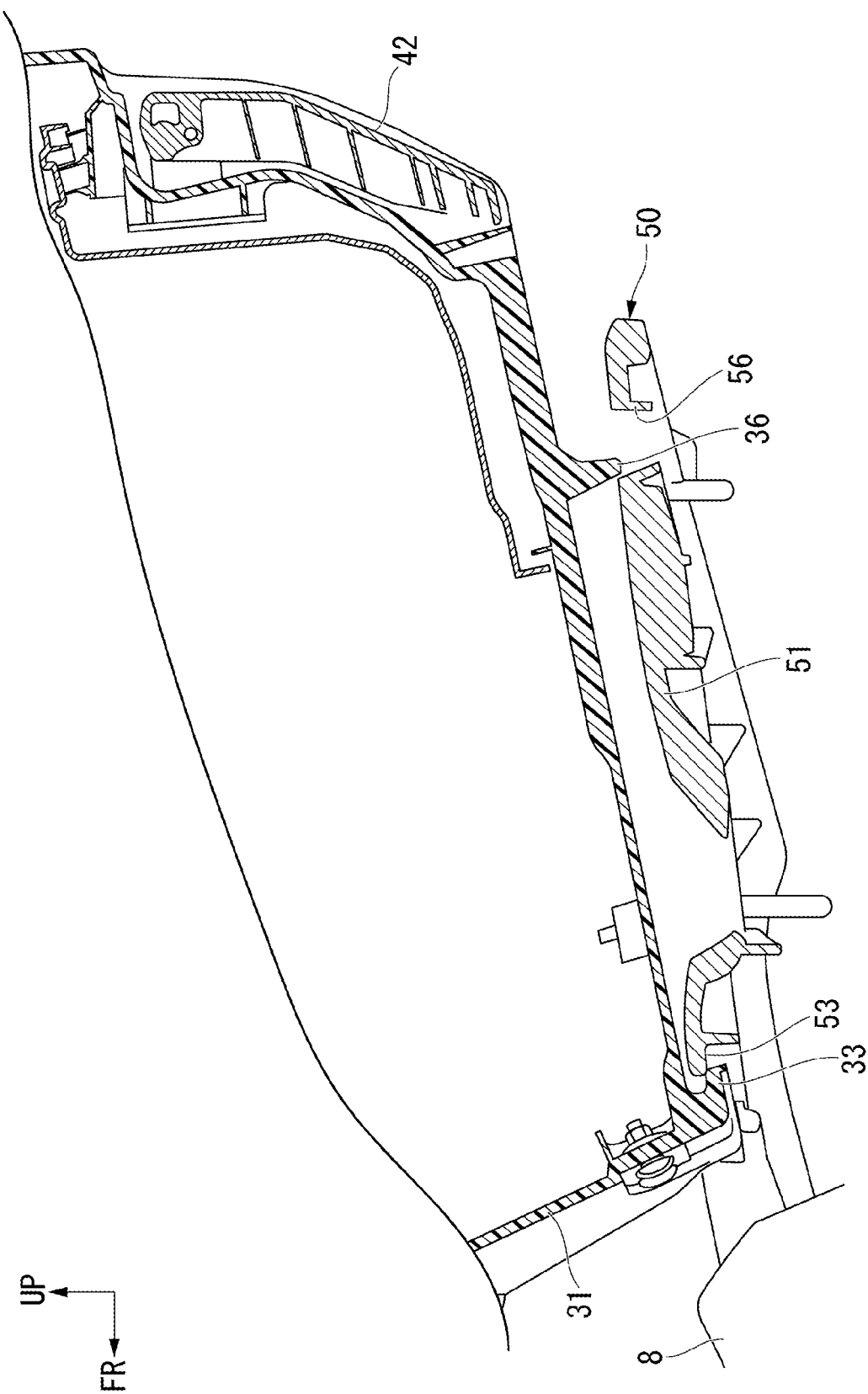
FIG. 16 is a view showing a process of an assembling procedure of the storage box according to the embodiment, including a cross section corresponding to FIG. 12.

Specifically, as shown in FIG. 16, the front hooks 33 are pushed into the front hook receiving sections 53 and positioned. After that, the rear hook 34 is pushed into the rear hook receiving section 54 (see FIG. 10) while the stoppers 36 are pushed into the stopper receiving sections 56 (see FIG. 15).

(4) Next, the key is pivoted counterclockwise and the box main body 31 is locked, and then, the key is removed.

(5) Next, the handle 42 is received in the U-shaped groove 31u.

According to the above-mentioned procedure, the storage box 30 can be attached to the carrier 50.

<Removal Procedure of Storage Box>

Hereinafter, an example of a procedure of removing the storage box 30 from the carrier 50 will be described.

For example, when the storage box 30 is removed from the carrier 50, a procedure of the following (1) to (5) is performed.

(1) First, the handle 42 is lifted, and a box main body unlocking button 40 and the key cylinder 41 are exposed to the outside.

(2) The key is inserted into the key cylinder 41 and pivoted clockwise, and locking of the box main body 31 is released.

(3) Next, the box main body unlocking button 40 is pushed, and the storage box 30 is removed from the carrier 50.

(4) Next, the key is pivoted counterclockwise and the box main body 31 is locked, and then, the key is removed.

(5) Next, the handle 42 is received in the U-shaped groove 31u.

According to the above-mentioned procedure, the storage box 30 can be removed from the carrier 50.

As described above, the storage box power supply structure 25 of the embodiment includes the storage box 30, the carrier 50 configured to detachably mount the storage box 30 on the vehicle body, the stoppers 36 configured to position the storage box 30 on the carrier 50, the stopper receiving sections 56 configured to receive the stoppers 36, the stopper-side terminals 70 provided on the stoppers 36 and configured to supply electric power to the lid lamp 46, and the receiving-side terminals 80 provided on the stopper receiving sections 56, connected to the stopper-side terminals 70 when the storage box 30 is mounted on the carrier 50 and configured to rub against the stopper-side terminals 70.

According to this configuration, since the receiving-side terminals 80 provided on the stopper receiving sections 56, connected to the stopper-side terminals 70 when the storage box 30 is mounted on the carrier 50 and configured to rub against the stopper-side terminals 70 are provided, the following effects are exhibited. Self-cleaning of the terminals 70 and 80 can be performed by friction when the stopper-side terminals 70 and the receiving-side terminals 80 are connected to each other. It is possible to remove the oxide films of the terminals 70 and 80 through self-cleaning of the terminals 70 and 80 or remove foreign substances such as sand bites or the like. In addition, since the power supply structure is provided on the stopper receiving sections 56, there is no need to provide a novel power supply part on the bottom section of the storage box 30, and also there is no need to greatly change shapes of the storage box 30 and the carrier 50. Accordingly, self-cleaning of a power supply structure using a conventional structure can be actively performed according to an operation of attaching and detaching the storage box 30 while a novel power supply part is not provided in the storage box 30.

In addition, in the embodiment, since the stopper-side terminals 70 and the receiving-side terminals 80 face each other in the forward/rearward direction when the storage box 30 is mounted on the carrier 50, flexibility in the vehicle width direction can be absorbed by the stopper-side terminals 70 and the receiving-side terminals 80. Accordingly, variations at the connecting position to the terminals 70 and 80 can be absorbed. In addition, friction due to vibrations in the contact sections between the stopper-side terminals 70 and the receiving-side terminals 80 can be minimized.

In addition, in the embodiment, since the biasing members 82 configured to bias the receiving-side terminals 80 toward the stopper-side terminals 70 are further provided, the stopper-side terminals 70 and the receiving-side terminals 80 can easily come into contact with each other.

In addition, in the embodiment, since the receiving-side terminals 80 include the bent sections 80a that are bent to protrude toward the stopper-side terminals 70, the following effects are exhibited. In comparison with the case in which both of the stopper-side terminals 70 and the receiving-side terminals 80 are formed in a flat plate shape, the stopper-side terminals 70 and the receiving-side terminals 80 can easily come into contact with each other.

In addition, in the embodiment, since the plurality of receiving-side terminals 80 are provided at an interval in the vehicle width direction, the following effects are exhibited. In comparison with the case in which only one receiving-side terminal 80 is provided, connection of the stopper-side terminals 70 and the receiving-side terminals 80 can be reliably performed. For example, when the plurality of stopper-side terminals 70 corresponding to the plurality of receiving-side terminals 80 are provided, they can be applied to various uses for a positive electrode terminal, a negative electrode terminal, a terminal for a stop lamp, and the like.

In addition, in the embodiment, since the partition walls 83 configured to divide the accommodating spaces of the neighboring two receiving-side terminals 80 are further provided, it is possible to prevent the neighboring two receiving-side terminals 80 from coming in contact with each other.

In addition, in the embodiment, since part of the protrusion edges 83a of the partition walls 83 are formed along external forms of the receiving-side terminals 80, it is possible to prevent the partition walls 83 from becoming obstacles when the stoppers 36 are pushed into the stopper receiving sections 56.

In addition, in the embodiment, since the protrusion edges 83a of the partition walls 83 are inclined to increase a protrusion height as they are separated from the introduction ports 56i of the stopper-side terminals 70, the following effects are exhibited. It is possible for the partition walls 83 to increase rigidity of the stopper receiving sections 56 while the partition walls 83 are prevented from becoming obstacles when the stoppers 36 are pushed into the stopper receiving sections 56.

In addition, in the embodiment, since the stoppers 36 are provided on the side of the storage box 30 and the stopper receiving sections 56 are provided on the side of the carrier 50, the following effects are exhibited. When the stopper-side terminals 70 on the side of the storage box 30 and the receiving-side terminals 80 on the side of the carrier 50 are connected to each other, positioning of the terminals 70 and 80 can be easily performed.

In addition, in the embodiment, since the vertical insertion holes 56h that open upward and downward in the vicinity of the stopper-side terminals 70 are provided in the stopper receiving sections 56, drainage can be performed through openings of the vertical insertion holes 56h. For example, even though the storage box 30 is mounted on the carrier 50 when it's raining, rain water and the like can be prevented from being collected in the stopper receiving sections 56.

In addition, in the embodiment, since the lid members 90 swingably provided on the carrier 50 and configured to cover the introduction ports 56i of the stopper-side terminals 70 when the storage box 30 is not mounted on the carrier 50 is further provided, the stopper receiving sections 56 are not exposed to the outside by the lid members 90. Accordingly, when the storage box 30 is not mounted on the carrier 50, it is possible to prevent foreign substances such as water, dust, and the like, from entering the stopper receiving sections 56.

In addition, in the embodiment, since the stoppers 36 include the load receiving sections 36b configured to receive a load from the stopper receiving sections 56 before the stopper-side terminals 70 and the receiving-side terminals 80 are connected when the storage box 30 is mounted on the carrier 50, it is possible to prevent an excessive load from being applied to the contact section.

In addition, in the embodiment, since the stopper-side terminals 70 and the receiving-side terminals 80 are configured to be connected by pushing the stoppers 36 into the stopper receiving sections 56 after the hook 33 are pushed into the hook receiving section 53, the following effects are exhibited. Since the stopper-side terminals 70 and the receiving-side terminals 80 are connected after the hook 33 and the hook receiving section 53 are positioned, the stopper-side terminals 70 and the receiving-side terminals 80 can be easily connected.

In addition, in the embodiment, since the pair of stoppers 36 are provided on left and right sides, the following effects are exhibited. Since the storage box 30 and the carrier 50 are positioned on left and right sides with good balance, in comparison with the case in which only one stopper 36 is provided, the stopper-side terminals 70 and the receiving-side terminals 80 can easily come into contact with each other.

Further, while the example in which the storage box 30 is provided on the rear section of the vehicle has been exemplarily described in the embodiment, there is no limitation thereto. For example, the storage box 30 may be provided on a front section of the vehicle or may be provided on a side portion of the vehicle (a side portion of the carrier 50).

In addition, while the example in which the stopper-side terminals 70 are provided on the left and right stoppers 36, respectively, has been exemplarily described in the embodiment, there is no limitation thereto. For example, the stopper-side terminals 70 may be provided on only one of the left and right stoppers 36. That is, the stopper-side terminals 70 may be formed on at least one of the left and right stoppers 36.

In addition, while the case in which the biasing members 82 configured to bias the receiving-side terminals 80 toward the stopper-side terminals 70 is provided has been exemplarily described in the embodiment, there is no limitation thereto. For example, the biasing member configured to bias the stopper-side terminals 70 toward the receiving-side terminals 80 may be provided. That is, a biasing member configured to bias at least one of the stopper-side terminals 70 and the receiving-side terminals 80 toward the other may be provided.

In addition, while the example in which the biasing members 82 are the coil springs has been described in the embodiment, there is no limitation thereto. For example, the biasing members 82 may be leaf springs.

In addition, while the example in which the receiving-side terminals 80 include the bent sections 80a that are bent to protrude toward the stopper-side terminals 70 has been described in the embodiment, there is no limitation thereto. For example, the stopper-side terminals 70 may include bent sections that are bent to protrude toward the receiving-side terminals 80. That is, at least one of the stopper-side terminals 70 and the receiving-side terminals 80 may include bent sections that are bent to protrude the other.

In addition, while the example in which parts of the protrusion edges 83a of the partition walls 83 are formed along external forms of the receiving-side terminals 80 has been exemplarily described in the embodiment, there is no limitation thereto. For example, all of the protrusion edges 83a of the partition walls 83 may be formed along external forms of the receiving-side terminals 80. That is, at least parts of the protrusion edges 83a of the partition walls 83 may be formed along external forms of the receiving-side terminals 80.

In addition, while the example in which the pair of stoppers 36 are provided on left and right sides has been exemplarily described in the embodiment, there is no limitation thereto. For example, only one stopper 36 may be provided or three or more stoppers 36 may be provided.

In addition, while the example in which the front hooks 33 each are formed in an L shape extending downward from the front lower section of the box main body 31 and then extending rearward has been exemplarily described in the embodiment, there is no limitation thereto. For example, the front hooks 33 may be formed in an L shape extending downward from the front lower section of the box main body 31 and then extending rearward.

In addition, while the example in which the pair of front hooks 33 are provided on left and rights has been exemplarily described in the embodiment, there is no limitation thereto. For example, only one front hook 33 may be provided or three or more front hooks 33 may be provided.

In addition, while the example in which the lid lamp 46 is provided as the electrical component has been exemplarily described in the embodiment, there is no limitation thereto. For example, the electrical component may be another electrical component such as a USB charger, a solenoid, or the like, or may be other lighting devices than the lid lamp 46.

Figure 17:
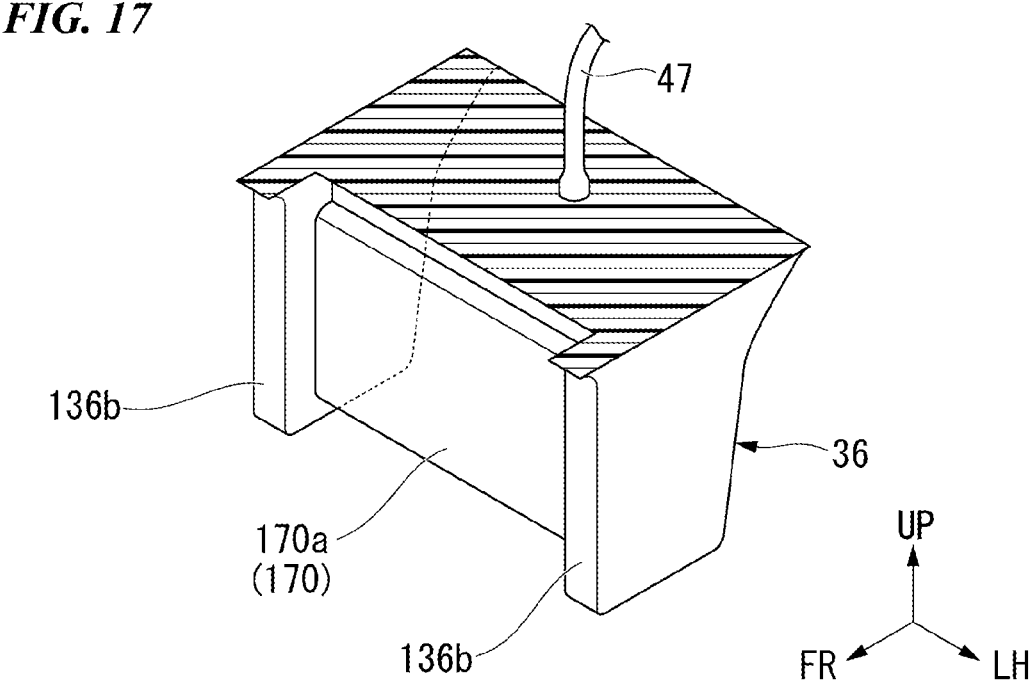
FIG. 17 is a perspective view showing a stopper according to a first variant of the embodiment from above to the left.
Figure 18:
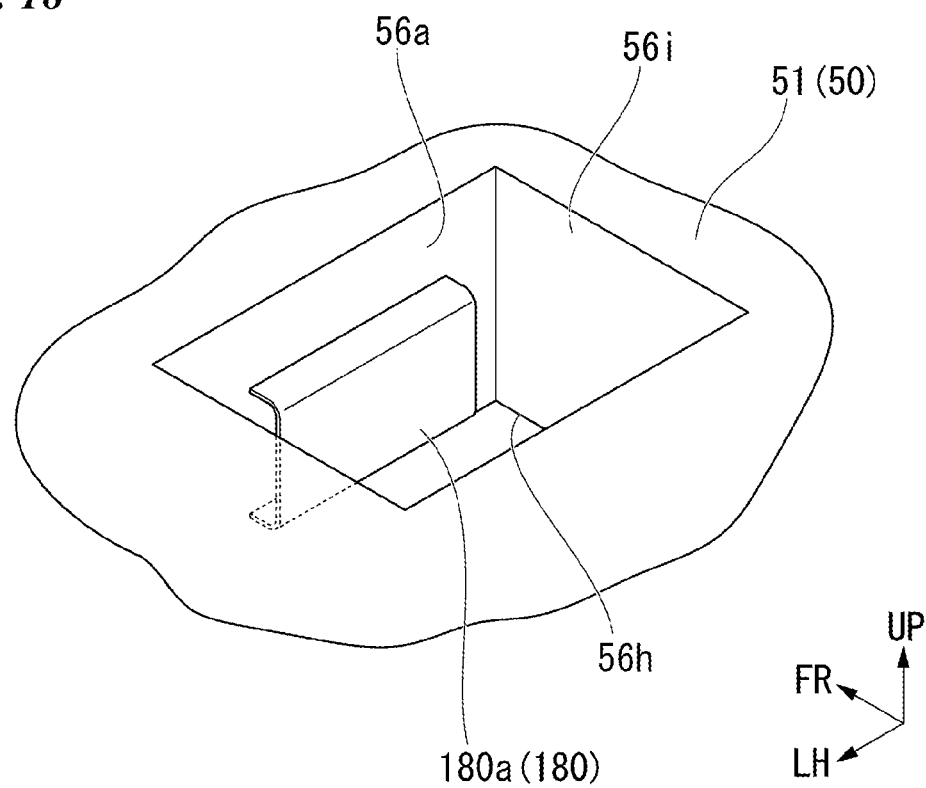
FIG. 18 is a perspective view showing a stopper receiving section according to the first variant of the embodiment from above to the left, corresponding to FIG. 14(b).
Figure 19:
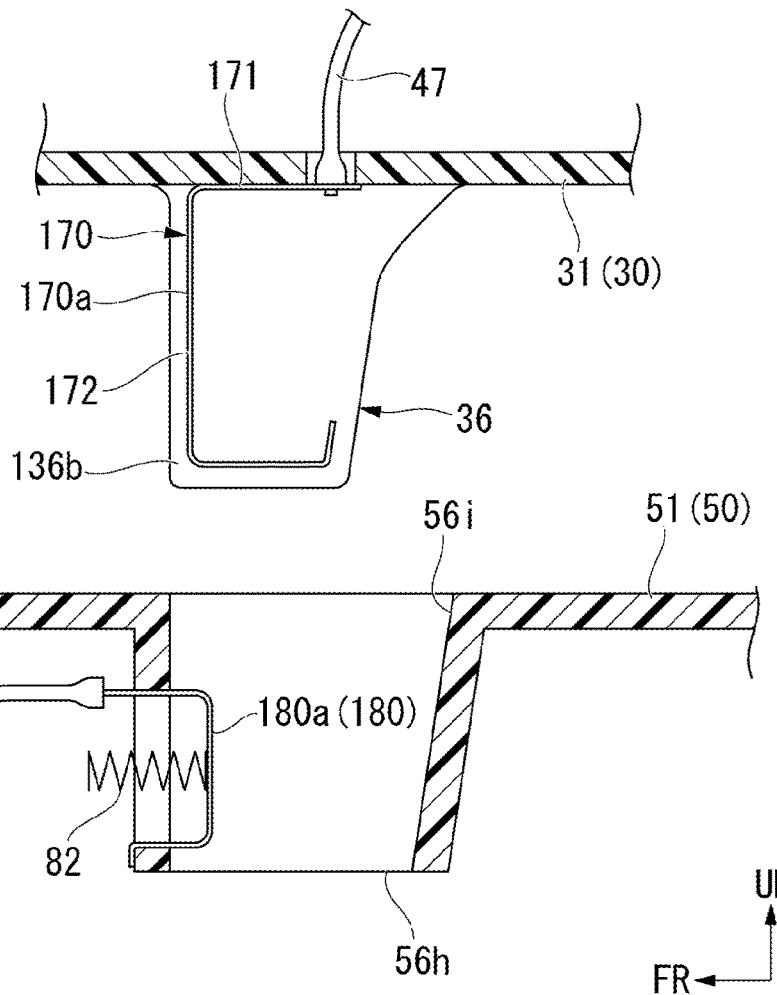
FIG. 19 is a view including cross sections of the stopper and the stopper receiving section according to the first variant of the embodiment.
Figure 19:
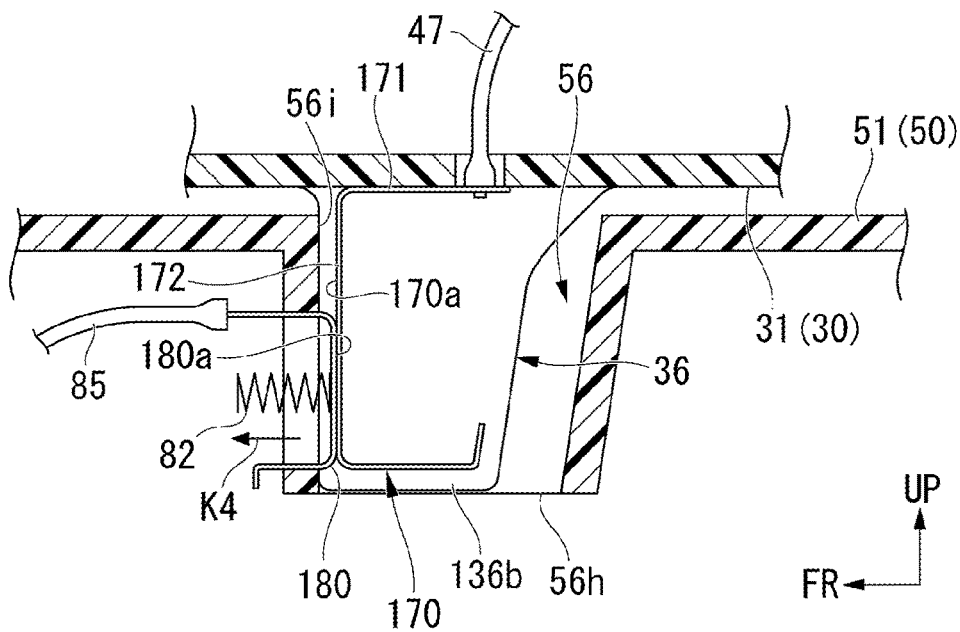

In addition, while the example in which the contact portions between the flat surface sections 70a of the stopper-side terminals 70 and the bent sections 80a of the receiving-side terminals 80 become the contact sections between the terminals 70 and 80 has been exemplarily described in the embodiment, there is no limitation thereto. For example, a contact portion between a flat surface section 170a (see FIG. 17) of a stopper-side terminal 170 and a flat surface section 180a (see FIG. 18) of a receiving-side terminal 180 may be a contact section between the terminals 170 and 180. In FIG. 17, reference sign 136b designates load receiving sections that constitute left and right sidewalls of the stoppers 36. In FIG. 17 to FIG. 19, illustration of the lid members 90 or the like will be omitted.

For example, as shown in FIG. 19(a), the stopper-side terminal 170 may include a longitudinal extension section 171 extending in the forward/rearward direction, and a downward extension section 172 having an L shape extending downward from a front end of the longitudinal extension section 171 to form the flat surface section 170a and then extending rearward. The longitudinal extension section 171 is attached to a bottom section of the box main body 31. A rear section of the longitudinal extension section 171 is connected to the lid lamp 46 (see FIG. 5) via the cord 47.

The receiving-side terminal 180 may be formed in a C shape (a U shape) having the flat surface section 180a that is able to come in contact with the flat surface section 170a of the downward extension section 172. The biasing members 82 configured to bias the receiving-side terminal 180 toward the stopper-side terminal 170 are attached to the receiving-side terminal 180. The receiving-side terminals 80 are connected to a battery (not shown) on the side of the vehicle body via the wiring 85.

As shown in FIG. 19(b), since the stopper receiving sections 56 receive the stoppers 36 after the front hooks 33 are received in the hook receiving sections 53 (see FIG. 16), the stopper-side terminal 170 and the receiving-side terminal 180 are connected. Here, the receiving-side terminal 180 moves against the biasing force of the spring members 82 in an arrow K4 direction while being connected to the stopper-side terminal 170. Accordingly, electric power can be supplied from the battery (not shown) on the side of the vehicle body to the electrical component (the lid lamp 46 shown in FIG. 5) on the side of the lid 32.

Figure 20:
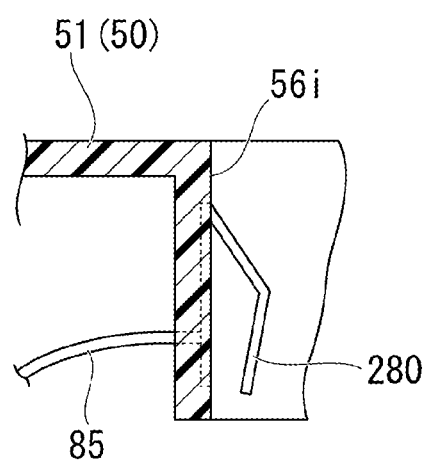
FIG. 20 is a view including a cross section of a stopper receiving section according to a second variant of the embodiment.

In addition, while the example in which the biasing members 82 configured to bias the receiving-side terminals 80 toward the stopper-side terminals 70 are attached to the receiving-side terminals 80 has been exemplarily described in the embodiment, there is no limitation thereto. For example, the receiving-side terminal 80 itself may be constituted by a biasing member such as a coil spring, a leaf spring, or the like. Accordingly, the number of parts can be reduced and reduction in costs can be achieved. For example, as shown in FIG. 20, a receiving-side terminal 280 having a leaf spring shape may be provided.

In addition, the present invention is not limited to the embodiment, and for example, all vehicles on which a driver rides on the vehicle body are included as the saddles vehicle, and in addition to a motorcycle (including a motorized bicycle and a scooter-type vehicle), a three-wheeled vehicle (including a two-front-wheeled and one-rear-wheeled vehicle in addition to one-front-wheeled and two-rear-wheeled vehicle) is also included. In addition, the present invention may also be applicable to a four-wheeled vehicle such as an automobile or the like, in addition to the motorcycle.

Then, the configuration of the embodiment is an example of the present invention, and various modifications may be made without departing from the spirit of the present invention, for example, substitution of the components of the embodiment with known components, or the like.

BRIEF DESCRIPTION OF THE REFERENCE SYMBOLS

1 Motorcycle (saddled vehicle)
25 Storage box power supply structure
30 Storage box
33 Front hook (hook)
36 Side stopper (stopper)
36b Load receiving section
46 Lid lamp (electrical component)
50 Carrier 53 Front hook receiving section (hook receiving section)
53h Rearward opening section
56 Stopper receiving section
56h Vertical insertion hole
56i Introduction port
70 Stopper-side terminal
80 Receiving-side terminal
80a Bent section
82 Biasing member
83 Partition wall
83a Protrusion edge
90 Lid member

What is claimed is:

1. A storage box power supply structure for a saddled vehicle, comprising:
a storage box;
a carrier provided on a rear section of a vehicle and configured to detachably mount the storage box on a vehicle body;
a stopper configured to position the storage box on the carrier;
a stopper receiving section configured to receive the stopper;
a stopper-side terminal provided on the stopper itself and configured to supply electric power to an electrical component; and
a plurality of receiving-side terminals provided on the stopper receiving section itself, connected to the stopper-side terminal when the storage box is mounted on the carrier and configured to rub against the stopper-side terminal, wherein
the plurality of receiving-side terminals are provided at intervals in a vehicle width direction, wherein
the plurality of receiving-side terminals are provided in one stopper receiving section.

2. The storage box power supply structure for a saddled vehicle according to claim 1, wherein the stopper-side terminal and the receiving-side terminal face each other in a forward/rearward direction when the storage box is mounted on the carrier.

3. The storage box power supply structure for a saddled vehicle according to claim 1, further comprising a biasing member configured to bias at least one of the stopper-side terminal and the receiving-side terminal toward the other.

4. The storage box power supply structure for a saddled vehicle according to claim 1, wherein at least one of the stopper-side terminal and the receiving-side terminal comprises a bent section bent to protrude toward the other.

5. The storage box power supply structure for a saddled vehicle according to claim 1, wherein the plurality of receiving-side terminals are neighboring two receiving-side terminals, further comprising a partition wall configured to divide accommodating spaces of the neighboring two receiving-side terminals.

6. The storage box power supply structure for a saddled vehicle according to claim 5, wherein at least a part of a protrusion edge of the partition wall is formed along an external form of the receiving-side terminal.

7. The storage box power supply structure for a saddled vehicle according to claim 5, wherein the protrusion edge of the partition wall is inclined to increase a protrusion height as the protrusion edge becomes further away from an introduction port of the stopper-side terminal.

8. The storage box power supply structure for a saddled vehicle according to claim 1, wherein the stopper is provided on the storage box, and
the stopper receiving section is provided on the carrier.

9. The storage box power supply structure for a saddled vehicle according to claim 8, wherein a vertical insertion hole that opens upward and downward in the vicinity of the stopper-side terminal is formed in the stopper receiving section.

10. The storage box power supply structure for a saddled vehicle according to claim 8, further comprising a lid member swingably provided on the carrier and configured to cover an introduction port of the stopper-side terminal when the storage box is mounted on the carrier.

11. The storage box power supply structure for a saddled vehicle according to claim 1, wherein a pair of stoppers configured to position the storage box on the carrier, wherein the pair of stoppers are provided on left and right sides of the vehicle.

12. A storage box power supply structure for a saddled vehicle, comprising:
a storage box;
a carrier provided on a rear section of a vehicle and configured to detachably mount the storage box on a vehicle body;
a stopper configured to position the storage box on the carrier;
a stopper receiving section configured to receive the stopper;
a stopper-side terminal provided on the stopper itself and configured to supply electric power to an electrical component; and
a receiving-side terminal provided on the stopper receiving section itself, connected to the stopper-side terminal when the storage box is mounted on the carrier and configured to rub against the stopper-side terminal, wherein the stopper comprises a load receiving section configured to receive a load from the stopper receiving section before the stopper-side terminal and the receiving-side terminal are connected when the storage box is mounted on the carrier.

13. A storage box power supply structure for a saddled vehicle, comprising:
a storage box;
a carrier provided on a rear section of a vehicle and configured to detachably mount the storage box on a vehicle body;
a stopper configured to position the storage box on the carrier;
a stopper receiving section configured to receive the stopper;
a stopper-side terminal provided on the stopper itself and configured to supply electric power to an electrical component; and
a receiving-side terminal provided on the stopper receiving section itself, connected to the stopper-side terminal when the storage box is mounted on the carrier and configured to rub against the stopper-side terminal, further comprising:
a hook configured to connect the storage box to the carrier; and
a hook receiving section configured to receive the hook, wherein the stopper-side terminal and the receiving-side terminal are configured to be connected by pushing the stopper into the stopper receiving section after the hook is pushed into the hook receiving section.

* * * * *